United States Patent
Möschl et al.

(10) Patent No.: US 8,344,848 B2
(45) Date of Patent: Jan. 1, 2013

(54) METHOD AND DEVICE FOR THE SAFE, SYSTEMATIC, EXCLUSIVE ASSIGNMENT OF THE COMMAND AUTHORIZATION OF AN OPERATOR TO A CONTROLLABLE TECHNICAL INSTALLATION

(75) Inventors: Manfred Möschl, Engerwitzdorf (AT); Manfred Schininger, Linz (AT)

(73) Assignee: Keba AG, Linz (AU)

( * ) Notice: Subject to any disclaimer, the term of this patent is extended or adjusted under 35 U.S.C. 154(b) by 853 days.

(21) Appl. No.: 11/918,112

(22) PCT Filed: Apr. 5, 2006

(86) PCT No.: PCT/AT2006/000136
§ 371 (c)(1),
(2), (4) Date: Jun. 3, 2009

(87) PCT Pub. No.: WO2006/105567
PCT Pub. Date: Oct. 12, 2006

(65) Prior Publication Data
US 2010/0127824 A1 May 27, 2010

(30) Foreign Application Priority Data
Apr. 8, 2005 (AT) ................................. A 596/2005

(51) Int. Cl.
*G05B 19/02* (2006.01)
*B25J 19/00* (2006.01)

(52) U.S. Cl. ........... 340/4.36; 340/4.31; 340/4.34; 340/12.22; 340/12.24; 318/568.11; 318/568.17; 318/568.24; 700/169; 700/180; 700/245; 700/257; 700/264

(58) Field of Classification Search .......... 340/4.31, 340/4.34, 4.36, 12.22, 12.24; 318/568.11, 318/568.17, 568.24; 700/169, 180, 245, 700/257, 264
See application file for complete search history.

(56) References Cited

U.S. PATENT DOCUMENTS

| 6,167,464 A | 12/2000 | Kretschmann |
| 6,711,713 B1 | 3/2004 | Rumpler et al. |
| 6,717,382 B2 | 4/2004 | Graiger et al. |
| 7,043,310 B2 | 5/2006 | Polz et al. |

(Continued)

FOREIGN PATENT DOCUMENTS

DE 199 20 299 11/2000

(Continued)

OTHER PUBLICATIONS

International Search Report.

(Continued)

*Primary Examiner* — Jennifer Mehmood
*Assistant Examiner* — Andrew Bee
(74) *Attorney, Agent, or Firm* — Collard & Roe, P.C.

(57) ABSTRACT

The invention relates to methods and appropriate devices for safely, unequivocally and exclusively, temporarily assigning the command authority of an operator (1) to a controllable technical system (60) using a mobile control device (2) which is technically suitable for periodically controlling a plurality of controllable technical systems (60), which is equipped as standard with safety switch elements (38, 39) such as an emergency stop switch, ok key and operating mode selection switches and for a data coupling with the controllable technical system (60) in spite of having only normal transmission means (6) or network technologies without any particular features specific to safety function.

35 Claims, 4 Drawing Sheets

U.S. PATENT DOCUMENTS

| | | | |
|---|---|---|---|
| 7,274,292 B2 * | 9/2007 | Velhal et al. | 340/539.32 |
| 2001/0035729 A1 * | 11/2001 | Graiger et al. | 318/587 |
| 2002/0091491 A1 * | 7/2002 | Jackson et al. | 702/56 |
| 2004/0070491 A1 * | 4/2004 | Huang et al. | 340/10.5 |
| 2004/0114584 A1 | 6/2004 | Patz et al. | |
| 2004/0143737 A1 * | 7/2004 | Teicher | 713/167 |
| 2004/0260518 A1 * | 12/2004 | Polz et al. | 702/188 |
| 2005/0246094 A1 * | 11/2005 | Moscatiello | 701/207 |
| 2006/0187029 A1 * | 8/2006 | Thomas | 340/539.13 |

FOREIGN PATENT DOCUMENTS

| | | |
|---|---|---|
| DE | 101 10 776 | 9/2001 |
| EP | 1 233 316 | 8/2002 |
| EP | 1 404 062 | 3/2004 |

OTHER PUBLICATIONS

English Translation of International Preliminary Report on Patentability.

\* cited by examiner

METHOD AND DEVICE FOR THE SAFE, SYSTEMATIC, EXCLUSIVE ASSIGNMENT OF THE COMMAND AUTHORIZATION OF AN OPERATOR TO A CONTROLLABLE TECHNICAL INSTALLATION

CROSS REFERENCE TO RELATED APPLICATIONS

This application is the National Stage of PCT/AT2006/000136filed on Apr. 5, 2006 which claims priority under 35 U.S.C. §119 of Austrian Application No. A 596/2005 filed on Apr. 8, 2005. The international application under PCT article 21(2) was not published in English.

The invention relates to methods and appropriate devices for safely, unequivocally and exclusively, temporarily assigning the command authority of an operator to a controllable technical system using a mobile control device. The mobile control device proposed by the invention is technically suitable for periodically controlling a plurality of controllable technical systems which pose a potential risk in terms of safe operation. In terms of safety switch elements, it usually has operator control elements such as an emergency off switch, ok keys and operating mode selection switches, which are provided as a means of outputting safety critical control commands alone or in combination with other operator control elements. In spite of safety requirements for transmitting safety critical control commands to a controllable technical system, the data interface is coupled via standard data transmission means and network technologies that do not require any special safety certification and the requisite safety features are assured by a special design of the control device proposed by the invention and a co-operating safe data transmission counter station proposed by the invention. An operator or the safe spatial assignment of an operator or the command authority of this operator is reliably spatially assigned to a control device proposed by the invention and the control device is reliably spatially assigned to a controllable technical system for data transmission purposes by means of electronically detectable and encoded tags. Operators, permissible input positions for establishing a connection to a controllable technical system as well as permissible operating ranges for outputting safety critical control commands are controlled by such encoded tags. The control device proposed by the invention is equipped with a reading unit which electronically detects the tags and such detection is only possible within a short range of the reading unit. Accordingly, the absence of reliably forced and unequivocal assignment, which would otherwise have to be provided by physical means, is replaced or completed by appropriate monitoring means for monitoring data communications.

Many industrial production plants, large machines, groups of co-operating manipulators and machines are required to operate with a high degree of automation these days.

Persons working in the local environment of specific parts of such plants can be exposed to considerable risks during operation, such as collision, crushing, other mechanical, thermal or chemical effects or radiation for example. Comprehensive safety regulations set out measures for minimizing the risks to people when such plants are operated on an automated, program-controlled basis. These include technically monitored protective fencing for individual processing cells or sections of plants.

In spite of the high degree of automation, it is nevertheless often necessary for engineers to intervene, especially when it comes to starting up, programming, maintaining and servicing such plants or parts of plants following incidents and faults. During this work, the presence of staff in the immediate operating and risk range of a machine is necessary, including within the boundary of protective fencing, for example when teaching a robot. A specially trained operator assumes manual control over at least some of the individual machine functions, using appropriate control devices for this purpose. Mobile hand-operated devices are preferably used for this purpose to give the operator sufficient mobility so that he has the best possible view of critical machines or areas of the plant whilst outputting control commands, such as the end effector of a robot for example. The safety of the plant and the staff within its operating range is crucially affected by the care and attention of the operator during this phase.

Although these plants run in automatic mode for most of the time and manual control is necessary during only a short period of the operating time, statistics show that it is then that by far most accidents occur. In order to reduce the risks, the relevant safety regulations often permit only restricted operation in so-called special operating modes of the machine, during which the speed of movement or driving power is significantly lower than it is during automatic mode. In addition, a machine movement is possible exclusively when a specially designed ok key provided as a safety switch element is depressed by the operator. The mobile hand-held devices usually also have an emergency stop switch conforming to specific standards or a stop switch configured on a different basis but operating in the same or a similar way, which the operator can use to temporarily interrupt all running and potentially dangerous machine operations in a specifically assigned part of the plant and establish a safe operating mode if he sees that a risk situation has occurred. The operating mode selection switch for manually switching the operating mode of a controllable technical system between fully automatic, program-controlled operation and one or more special operating modes to permit at least a certain degree of manual control by an operator is also usually designed as a safety switch element.

It is precisely during these special phases of manual control of a machine or plant, when special operating modes are initiated, that hidden technical faults first come to light, such as software errors, or different functions of the plant have not even been placed in full operating mode and tested, and damage can also occur which can very easily and often does lead to malfunctions, exposing people in the vicinity of these technical faults to increased risk. Relevant safety guidelines therefore define strict requirements for the design of the entire signal path from the safety switch element to the drives and actuators of the controllable technical system, which in its entirety is generally referred to as a safety loop. By contrast with control and signaling components of the controllable technical system which function normally, the safety loop is based on a very special, reliable design so that individual faults can not lead to a loss of safety function (so-called single-fault safety) and any faults which exist are detected and can not lead to an undetected accumulation of faults ultimately causing a loss of safety function.

The safety switch elements often act on the drives or power supply of the plant directly or via an appropriately configured safety logic, for example a safety SPC, and place it in a safe state whenever the respective functional machine controller or the hand-held device is no longer fully functioning due to a technical defect or a software error or an external fault (e.g. in the event of cogging of a key for initiating a process movement). To this end, the safety switch elements are usually designed as particularly reliable multi-circuit switch elements. The concept of so-called single-fault safety is also applied along the entire active chain (safety switch element, transmission routes, power switch, ...). This being the case, an individual defect or fault in the overall signal chain should not lead to the loss of safety function. It must still be possible to bring the plant into a safe operating mode, even if there is an individual defect in the safety loop, and reliably prevent the triggering or continuation of a safety critical machine operation, i.e. one which poses a potential risk. In practical terms, single-fault safety operates on the basis that the contacts for the safety switch elements are provided at least in duplicate and the signals are transmitted at least twice across independent signal or data paths. Accordingly, the safety switch elements actively and unequivocally signal a safe state across more than one circuit. As soon as even one of the circuits ceases to signal a safe state, the plant is automatically switched to a safe operating mode (for example by shutting down the drives).

The stringent requirements imposed by safety guidelines are often diametrically opposed to the desire of users and operators of such plants and such controllable technical systems for maximum flexibility.

It is of advantage and, above all for reasons of cost, desirable to use universal hand-held devices which can be used interchangeably with different machines or different parts of the plant. Since these hand-held devices are needed for only relatively short operating phases at specific points, the use of such universal hand-held devices enables the number of devices needed to be significantly reduced, thereby also significantly reducing procurement costs. Limiting the number of types of devices reduces warehousing requirements and replacement part costs and also improves handling because users do not have to keep using totally different hand-held devices depending on the plant or machine. Since the assignment and data connection between the hand-held device and controller or safety loop of the plant is no longer fixed but can be varied, there is a possibility that a control device might be incorrectly assigned by the operator or the operator could be mistaken about the actual assignment. As a result, there is an increased risk of inadvertently triggering a safety critical control action at another point that is not the one actually intended by the operator.

It is of particular advantage and, for the user, desirable if mobile hand-held devices are designed with a wireless data connection to the respective functional controller of the technical system because this offers the greatest possible freedom of movement during the control operations without being hindered by a cable and also makes for an easy switch between different machines and parts of the plant. However, this significantly increases the risk of an incorrect assignment because the design of the wireless connection is such that in theory, several possible counter-points or destinations may exist within the transmission and reception range, and the machine or part of the plant to which the connection is actually established is not obvious or unequivocally clear to the operator.

Another risk occurs due to the wireless data connection in that an operator can establish a connection to a controllable technical system correctly and then move with the control device out of the specific operating range for the machine or that part of the plant, for example leave the production cell, and can then, possibly unconsciously but at least inadmissibly for safety reasons, send control commands to the technical system but without having noticed that a risk situation has occurred with respect to other people in the vicinity, for example, and as a result may not be in a position to react.

Another source of danger is the fact that the transmission means used might not be suitable from a technical point of view. For reasons of cost, data networks or data buses, both hard-wired and wireless, are used by preference in many plants to establish a data connection to the different control and monitoring means. It is conducive from an economic point of view and desirable with a view to using standard and readily available solutions for exchanging data within an operation to use conventional network or radio transmission standards such as Ethernet, Wireless LAN (WLAN), Bluetooth, ZigBee or such like, for example. They offer cost-effective, flexible and, in terms of resources, efficient connections between components. However, there is normally a plurality of data sources and data sinks using a specific physical transmission virtually at the same time, either alternating in time or simultaneously, across different modulated carrier frequencies (for example radio channels). However, unlike a hard-wired real or physical point-to-point connection, a specific data source is not unequivocally and not necessarily physically connected to a specific data sink and instead is connected only logically by means of specific codes or addresses. Although these standard transmission means normally function reliably, there is no way of guaranteeing that a data telegram will be sent from a transmitter to an intended receiver and there is always a possibility of misrouting due to an individual software error or hardware fault, due to incorrect configuration of the subscribers' addresses or due to a distortion of address information caused by electromagnetic or other interference. These standard data transmission means do not have the requisite safety system for transmitting safety switch states in the context of a safety acceptance test, which means that appropriate safety measures have to be taken in order to ensure guaranteed safety in the data terminal devices.

Even if a data assignment is made between a control device and a machine or a part of the plant without error, a situation may arise with respect to the technical system where although the source of a data telegram is identified by an address or similar at the device level, the exact local origin the message is not, in other words the location of the mobile control device. For example, for reasons of convenience, an operator might establish a data connection from a remote point from which it is not possible to gain an adequate view of the controlled part of the plant, and a potential risk situation amongst other persons in this part of the plant might not be seen by this operator under certain circumstances.

For safety reasons, it is also vital that safety critical commands can be reliably issued from only a single point or from a single operator and that several control devices and several persons are not simultaneously connected to the functional controller or safety loop of a machine, competing as it were. Accordingly, an unequivocal point-to-point connection between exclusively one control device and one controllable technical system must be guaranteed. An error could occur in particular if an existing data connection were temporarily interrupted due to interference of some sort but this led to the connection of only one of the communicating partners to be cut. In another call, a third call subscriber could then establish a connection to the subscriber with the cut connection, whereas the original call subscriber, having eliminated the fault, would again be in a position to send data telegrams to the same subscriber or receive them from him.

Another possible source of danger arises if, for example, when a production line is switched on, several persons are working in adjacent parts of the plant or production cells, each using mobile control devices of the same type, and are in the process of programming or inputting settings. If the control devices are temporarily put down during an existing data connection, for example to free up both hands for a manual action, there is a risk of a wrong control device being mistakenly picked up again and a safety critical command being sent to a wrong part of the plant. It is often difficult for operators to differentiate between control devices if they are of the same type and a mistake of the type described above can not be ruled out. A similar risk can occur due to possible control actions by unauthorized persons should they pick up a control device that has been put down whilst a data connection exists or such a data connection could easily be established.

All the sources of risk outlined above are based on the underlying phenomenon of an intended, unequivocal and exclusive assignment having been made of the command authority of one of a plurality of possible, specifically authorized operators to a specific one of a plurality of controllable technical systems, but it has either been made incorrectly or has been changed without authorization.

Patent specification DE 101 10 776 A1, the disclosed contents of which are explicitly and fully included in this document, discloses a method of safely assigning a hand-held device, either wirelessly or coupled for via a bus system for data transmission purposes, to one specific machine of a plurality of assignable machines or plants. In this system, an independent second data channel with a defined limited range or a defined directional characteristic to a counter-point or log-on point on the machine is used, in addition to the transmission channel for the actual useful data. Data needed to log on and communicate across the useful data channel, such as addresses for example, is exchanged across this second data channel. This being the case, the user of a hand-held device must quite deliberately move into the immediate vicinity of a designated log-on point or specifically take a bearing on such a log-on point in order to establish a data connection to the controller of a machine. The log-on points are locally assigned to the respective machine or the respective part of the plant, which practically rules out the possibility of the user making a mistake about the selected machine or part of the plant or making a mistake about the address when logging on, and also rules out the possibility of an unauthorized connection being established from a distance away.

However, in terms of the requirements imposed by safety systems, there is still a risk of a faulty or misrouted data transmission caused by technical factors. Bus connections and radio connections certified for safety regulations where this risk is ruled out or reduced as necessary by appropriate features are known from the prior art and are also commercially available, but for reasons of cost these are used on a locally limited basis or for specific situations only. However, widely used and inexpensive standard data networks such as Ethernet, WLAN and Bluetooth for example, are not guaranteed for the safety or fault-free operation required for safety certification, in spite of the fact that they are generally highly reliable.

The prior art also fails to address the safety risk caused by inadvertent mixing of hand-held devices once a data connection to a controller has been established or unauthorized switching on.

Likewise unsatisfactory is the design option used for monitoring the workplace where an operator using the mobile control device and having made an assignment to a controllable technical system must wait before being able to download appropriate control commands.

Accordingly, the objective of this invention is to specify and propose a method of establishing, monitoring and terminating a safe and unequivocal assignment of the command authority of an authorized operator to a mobile control device and also to a safety loop of a controllable technical system and to the operating range in the area of the controllable technical system from which the operator control may issue commands. Another objective of the invention is to propose methods of establishing an unequivocal and safe temporary data connection from a mobile control device to the safety loop of a controllable technical system and for temporarily and safely assigning the control device for the purpose of the data transmission to an operating range from which authorization signals may be transmitted to the safety loop. Yet another objective of the invention is to propose appropriate devices, in particular a safe mobile control device, a safe data transmission counter station as well as appropriate electronically detectable encoded tags for implementing the methods proposed by the invention.

Surprisingly, the large number of risks described above and the associated safety problems, which have not been solved by the prior art or have been so only unsatisfactorily or partially, are comprehensively solved in a simple approach using the methods and devices proposed by the invention.

The solution proposed by the invention is based on the fact that universally usable mobile control devices lack of a system of physically forcing an assignment to the safety loop of a controllable technical system, which exists in the case of stationary control systems due to hard-wired cable-connected, unequivocal point-to-point data connections and due to the stationary mounting of the control device, and this is therefore replaced by technical monitoring means.

To this end, electronically detectable and distinguishably encoded and differently used tags are provided. The mobile control device proposed by the invention is also provided with a reading unit, preferably designed for wirelessly detecting these tags or their codes. This reading unit has a relatively limited detection range or short detection distance so that, due to safe detection of a tag, the spatial closeness of this tag to the reading unit can also be safely established on the basis of a safety standard. In order to ensure that safe detection conforms to the safety standard, the control device is equipped with at least two processors or detection circuits, which read the tag codes independently of one another and on a single-fault safety basis via the reading unit, check them and use them to communicate with the controllable technical system. In addition to detecting the tags safely, the at least two processors also continuously evaluate the switching or operating states of the safety switch elements fitted in the control device independently and on a single-fault safety basis and encode them, each independently, in data telegrams. These data telegrams are transmitted via a data interface to the controllable technical system. The data telegrams are provided with appropriate codes, channel and check data so that they can be checked at the receiver for completeness, origin, lack of errors and up-to-dateness.

As a data communication partner and an interface for establishing a safe point-to-point communication from the mobile control device to the safety loop of a controllable technical system, the invention proposes an appropriately configured safe data transmission counter station. This safe data transmission counter station is hard wired into the safety loop. Data telegrams which have been safely encoded and provided with check data are received by the control device across a data interface to the interconnected data transmission means in the direction of the mobile control device and, in the same way as in the control device, are likewise received by at least two processors or monitoring circuits and checked independently and on a single-fault safety basis and evaluated, and signals corresponding to the content of the data telegrams and the safety status of the data connection as well as data are forwarded to the safety loop.

The electronically detectable tags are used in three different formats within the context of the invention:

1.) As a Key Tag:

In order to identify authorized operators, they are assigned a personalized tag, which will be referred to as a key tag below and which the operators carry with them. In terms of a code, a key tag has at least one unequivocal user code of the assigned user, and optionally contains other user-specific information, such as authorization data and password information. Due to the safe detection of a specific key tag, the spatial closeness of the associated operator to the mobile control device is safely established.

2.) As a Log-on Tag:

Special log-on points, which are locally visually perceptible and are assigned precisely to a specific controllable technical system and must be sought out in order to establish an unequivocal assignment of a mobile control device to this controllable technical system, are provided with an electronically detectable tag, referred to below as a log-on tag. The log-on tags incorporate at least one security code, which unequivocally designates a safe data transmission counter station connected into the safety loop of the technical system as being a communication partner for a mobile control device. Other encoded information which might be included in the log-on tag is address and access data for establishing the data connection across one or optionally several interconnected data transmission means, in particular across data networks. Other encoded information might relate to the assignment of an operating range provided for this log-on position, for example a zone identification code. Due to the safe detection of a specific log-on tag, the local closeness of the mobile control device to the log-on tag is safely ascertained.

3.) As a Zone Tag:

In the local area, referred to below as operating range, surrounding a controllable technical system in which a mobile control device may be used to download safety critical control commands to the technical system and its safety loop once an appropriate data assignment has been established, one or more tags, referred to hereafter as zone tags, are coded so that at least one such zone tag can always be reliably detected by the reading unit of the mobile control device within the operating range. The zone tag carries at least one code, referred to below as a zone code, which provides data identifiably coding the zone. Due to the safe detection of a specific zone tag, the local presence of the mobile control device within the zone, which is spatially fixed by the zone tag, is reliably ascertained. The layout and extensions to the operating range can be fixed on the basis of the number and layout of zone tags flexibly and relatively easily and practically.

Passive or active radio transponders, often also referred to as RFIDs, are particularly suitable for use as tags. They are widely available and offer a reliable and inexpensive form of providing electronically detectable encoded tags.

A reliable assignment of an operator to a control device which is not susceptible to confusion is then provided in the form of a special log-on procedure, during which the operator is identified by means of his key tag and optionally by entering an additional password in the control device, and the user code of the key tag is read and, once a valid password has been entered and a check run of any individual user rights which might have been allocated in a memory of the control device, registered as an active user code. This assignment of the operator initially takes place totally independently of any existing or subsequent assignment of the control device to a specific controllable technical system or as an advance and intrinsically closed process for a subsequent assignment process of the control device to a specific controllable technical system.

Whilst an active user is being registered in the control device, the control device repeatedly tries to detect the key tag of the registered user at regular intervals by means of the built-in reading unit. The different control functions, in particular safety critical control commands, are not released unless the key tag is regularly, safely and independently detected by the two processors or detection circuits. Immediately the key tag can no longer be detected or a key tag that is different from that of the registered user code is detected, at least some of the control functions of the control device are automatically locked. They are not automatically released again until the key tag of the registered user has been safely detected again.

The log-on procedure is also configured so that only a single operator can ever be registered as an active operator, in other words the log-on procedure can only be run if no operator has already been registered in the control device as an active user. It is not until a special log-off procedure is run that the registered active user code is deleted from the memory of the control device again or designated as inactive, and only then can another operator log on. In order to guarantee to the active user absolutely that, having successfully logged on, he alone has access to the functions of the control device, the log-off procedure can not be run unless the key tag of the registered user is safely detected. Furthermore, the active user code is preferably stored in a non-volatile memory of the control device so that even if the power supply to the control device has been switched off and switched back on again, a previously configured user allocation is saved and another operator is not able to gain access to the control device.

As a result, mistaken or malicious use of the control device by a person who is in principle not authorized is also reliably prevented, as is mistaken or malicious use by a person other than the registered operators. A mistaken swapping of mobile control devices with an existing assignment and data connection to a controllable technical system will therefore not have any safety critical consequences.

The reliable and unequivocal assignment of a mobile control device proposed by the invention to the safety loop of a controllable technical system or to the safe data transmission counter station hard-wired into the safety loop of the technical system takes place at least partially in the same way.

In this case, at least one log-on point is fixed, and because of the spatial position and assignment to the controllable technical system, this assignment is visibly unambiguous and obvious to an operator. An appropriate log-on point of this type might be directly outside the protective doors to a processing cell of a robot protected by means of fencing during automatic operation. These and optionally also other alternative fixed log-on points will be identified by electronically detectable log-on tags. The log-on tags used each carry at least one security code.

At the safe data transmission counter station of the technical system, this security code of the log-on tag is registered permanently in a non-volatile memory. If there are several possible log-on points, several security codes of the several log-on tags may be registered if necessary. The assigned log-on tags and their security codes are normally registered once during the course of installation or commissioning of the technical system on site by specially authorized persons or are registered by the manufacturer prior to delivering the technical system.

The log-on procedure for unequivocally assigning the control device to the technical system requires an operator to go with the mobile control device to the at least one assigned log-on position and start the assignment procedure there or it may also be initiated automatically. Accordingly, the log-on tag, in particular the security code stored in it, is read by means of the reading unit of the control device and safely detected by the processors or detection circuits. At the same time as the security code, different address or access data may also be read from the log-on tag, by means of which a data connection to the assigned safe data transmission counter station can be established via the interconnected data transmission means, such as a radio data network for example. The data packets which are sent from the control device to the data transmission counter station are identified by the read security code. As a result, the correct origin of the data telegrams can be safely and independently checked from the location of the log-on tag by the processors or monitoring circuits at the data transmission counter station by means of the permissible security codes permanently registered there. Any transmission errors during transmission across data transmission means that are not certified to safety standards and might lead to a data transmission to a wrong data transmission counter station can be unequivocally detected due to the security code loaded independently by means of the reading device into the control device and safely checked at the assigned data transmission counter station. A faulty connection incorrectly set up due to technical factors is therefore prevented reliably and irrespective of the transmission safety of the interconnected data transmission means. By preference, a one-off connection identification code is generated and stored in the control device during the course of the log-on procedure, for example based on a combination of the date, time, a device code, the read security code and a random number, which unequivocally codes the newly established assignment between the control device and data transmission counter station, and this is transmitted together with the security code to the data transmission counter station, where it is registered as an active connection identification code and stored in a memory, after which it is used to identify and check transmitted and received data telegrams. The connection identification code is valid only for the duration of the assignment. Once the assignment is terminated and then re-established, a new connection identification code is generated, registered and a data code used so that data telegrams which were identified by a connection identification code used earlier are detected as being invalid and ignored.

If the connection set-up is accepted by the safe data transmission counter station, the connection identification code and/or the security code are also registered in the control device and at least one of them is used to identify the transmitted data telegrams or check those received. Any misdirection of the data telegrams due to technical faults in the interconnected data transmission means which are not certified to safety standards are reliably detected and the relevant data telegrams are ignored without a loss of safety function.

Both the control device and the data transmission counter station are configured so that a connection set-up is only possible if no registered connection exists at the time. Before a new assignment can proceed therefore, a previously existing assignment must be terminated by a correct log-off procedure and a registered active security code and optionally a connection identification code deleted from the respective memory or designated as inactive. This ensures that only one unequivocal point-to-point connection can exist between a control device and a data transmission counter station and two users are not able to transmit control commands by means of two control devices simultaneously and in competition with one another or one user with one control device is not able to download control commands to two data transmission counter stations simultaneously.

In order to prevent an existing assignment from being cut off or terminated unintentionally, erroneously or due to a technical fault, it is preferable if a log-off procedure can not proceed unless a valid log-on tag has been safely detected. In addition, the connection data registered and stored both in the mobile control device and in the safe data transmission counter station is preferably secured in a non-volatile memory so that once an assignment has been established, it is reliably saved even after the respective power supply has been switched off and switched back on again.

All in all, as a result of the described assignment procedure using the log-on tags, the risk of a data assignment being incorrectly directed to a technical system other than that intended by the operator is virtually totally eliminated. In addition, a potential loss of safety function due to transmission of the safety relevant data telegram following a technical fault, both when setting up the connection and during the ongoing communication, is reliably prevented. Situations are also prevented in which several control devices or several data transmission counter stations are involved in a data connection during a single technical fault when setting up or terminating a connection.

Linking the safe assignment procedure for an operator to a control device and the safe assignment procedure of a mobile control device to a controllable technical system also means that a safe and unequivocal assignment of an operator or his command authority to a controllable technical system is established. This being the case, user data, in particular the unequivocal user code which was registered in the control device during the process of assigning the operator to the control device, is transmitted onwards to the data transmission counter station during the course of assigning the mobile control device safely to the controllable technical system and registered there as an active user code and preferably stored in a non-volatile memory. For safety reasons, this assignment of the user to the technical system can only be cancelled by the registered person himself. If the user code from the key tag of the registered user continues to be safely detected in the control device by means of the reading unit and used to identify the transmitted data telegrams, a response can be generated to the absence of the registered user of the control device in the safe data transmission station independently of the control device, and safety critical control commands and functions can also be reliably locked in the data transmission counter station to prevent initiation by unauthorized or non-registered persons. A major safety advantage of assigning the user to the controllable technical system resides in the fact that, from the point at which an assignment has been established to the point at which the assignment has been correctly terminated, no person other than the registered user is able to carry out safety critical control actions in the technical system. For example, if the registered user switches from automatic mode into a special operating mode, the special operating mode remains selected until the registered user himself changes this selection again. Accordingly, the registered user is able to undertake maintenance work on the technical system for a long period without risk and without endangering other persons due to careless or unintentional control actions. In practice, this problem has been only inadequately addressed in the case of operating mode selection switches which can be locked in a specific position with a key. Such switch elements designed as safety switch elements based on a multi-circuit arrangement and often with several switch positions for several different special operating modes are extremely expensive on the one hand and are also not actually safe because there are almost always several keys or replacement keys for one switch, especially as key switches used in industrial applications are specifically susceptible to the risk of damage due to breakage or a key can be lost. The latter situation often leads to keys being left in the switch, which means that there is no guarantee whatsoever to prevent inadmissible control actions. This risk is reliably ruled out by the procedure proposed by the invention of safely assigning the operator to the controllable technical system and locking all safety critical control actions in the case of all other persons until the assignment has been correctly and deliberately terminated.

The assignment of an operator to a controllable technical system may also advantageously be used in conjunction with a specific log-off procedure. Accordingly, although the operator terminates the data assignment and active connection of the mobile control device to a first technical system, he continues to remain actively registered as the sole user of this technical system. The operator can therefore use the mobile control device to undertake a control action on another technical system in the meantime, for example a neighboring robot cell, but as before, any inadmissible switching on of the first technical system by another operator continues to be reliably prevented. A mobile control device can not be successfully assigned to the first technical system again until the user who is already registered in the technical system as the active user is registered on this control device as the active user.

Over and above the gains in pure safety, the safe registration of a specific user in a technical system also enables corresponding automated records to be kept in respect of the log-on and log-off procedures and the control actions undertaken, which can be used subsequently to clarify how accidents occurred, provide evidence and prevent similar accidents in future.

Another quite remarkable improvement in safety which is achieved by using mobile and preferably wirelessly coupled control devices for data transmission is the possibility of using the electronically detectable tags as zone tags in order to set up a permissible operating range from which safety critical control commands can be downloaded from a correctly assigned mobile control device to a controllable technical system.

In terms of position and distance, the zone tags are arranged within the set permissible operating range so that at least one of the zone tags can always be safely detected by the mobile control device positioned within the operating range by means of the built-in reading device. At the same time, however, the zone tags are also positioned so that with a control device positioned outside the operating range, the zone tags can no longer be detected, even at the shortest possible distance from the edge of the set operating range.

Preferably all of the zone tags used to set up a specific operating range preferably carry a standard zone code, which unequivocally designates this operating range and which is registered in the mobile control device or optionally also in the data transmission counter station, at least once the control device has been successfully assigned to the controllable technical system. Alternatively, the zone tags used to set up the operating range may also carry individual zone codes and the corresponding number of zone codes assigned to the operating range may be registered in the mobile control device or data transmission counter station.

In the same way as the security code of the log-on tag, the one or optionally several zone codes which can be safely detected inside the set operating range are permanently registered in the data transmission counter station, for example, and are transmitted from the data transmission counter station to the control device whilst the mobile control device is being assigned to the technical system if necessary. Alternatively, however, the zone codes may also be permanently stored in the log-on tag and transmitted to the mobile control device from there and optionally forwarded to the data transmission counter station and registered and stored.

Whilst the mobile control device is assigned to the technical system and hence to the safe data transmission counter station and to the set permissible operating range, continued attempts are made by the processors of the control device to safely detect the zone tags and their zone codes by means of the reading device. The safely detected zone codes are either compared with the registered permissible zone codes in the control device or sent to the data transmission station, where they are compared with the registered permissible zone codes. As soon as a zone code corresponding to a registered permissible zone code is no longer detected, there is no longer any guarantee that the mobile control device is still within the set operating range and at least some of the safety critical control functions are locked. For reasons of safety, the detected zone codes and the registration of the permissible zone codes are advantageously checked in the data transmission counter station.

This provides an easy way of ensuring that safety critical control commands can only be issued and carried out inside the set operating range. Erroneous or malicious removal of a mobile control device from the operating range can therefore not lead to a loss of safety function in spite of the continuing existence of the data connection to the technical system. Consequently, one of the problems of mobile control devices wirelessly coupled for data transmission compared with hard-wired control devices, which until now has been only inadequately addressed from a safety point of view, is therefore satisfactorily resolved.

In summary, it should be reiterated that the astonishing list of safety issues are comprehensively and satisfactorily resolved as a result of the invention and are so using simple, reliable and inexpensive technical means.

One objective is achieved on the basis of the features according to an aspect of the invention.

The invention proposes a mobile control device with a data interface, at least two processors or detection circuits and a reading unit for detecting electronically readable tags or codes. Control commands and optionally operating states of safety switch elements are transmitted via the data interface to a controllable technical system and if necessary display data for displaying information on an output means of the control device is received by this controllable technical system and optionally other information exchanged. The reading unit enables tag codes of electronically readable tags which are positioned either in the vicinity of the reading unit or positioned or placed in direct contact with the reading unit to be detected. Due to the limited detection range of the reading unit, when a specific tag is correctly detected, a spatial closeness between the tag and the control device is guaranteed. For example, when stationary, unequivocal or unmistakable tags with a known position are detected, the position of the control device can be reliably pinpointed from the instant of detection. If unequivocal or unmistakable tags are fitted on persons, detection of such a tag ensures that the person is close to the control device and the person can be identified.

The at least two processors or detection circuits are each able to encode messages in data telegrams independently of one another and send them across the data interface to the controllable technical system. In this respect, data telegrams can either be prepared by the two processors independently and transmitted separately or a separate encoded part of a jointly sent data telegram can be prepared independently by each processor. In the data counter station, the data telegrams are then independently evaluated by at least two co-operating processors or monitoring circuits. A safety critical message, for example relating to the operating state of a safety switch element is therefore detected, transmitted and evaluated at least twice. Accordingly, a single fault in the transmission chain as a whole can not lead to a safety critical control command being carried out unintentionally.

If the data telegrams encoded by the two processors are additionally identified by tag codes which were read from a tag by means of the reading unit beforehand, the exact origin of the message can be verified in the data transmission counter station in which all of the permissible tag codes for this counter station are registered. The origin may refer both to the location of the control device and to the person who is using the control device and initiated the message. Since this code can not reach the mobile control device via the data interface but can only be detected by means of the additional reading unit independently and by two circuits, incorrect assignment of the control device or operator to the controllable technical system due to a technical error can be reliably ruled out in compliance with current safety standards. This technical safety level of the assignment is achieved totally irrespective of the safety level of the interconnected transmission channels, for example radio networks, and obviates the need for special and expensive safety buses and such like.

An advantageous embodiment enables a data transmission from the assigned data counter station, for example the controller of the technical system, to the mobile control device so that both more reliable communication protocols can be used and process or display data, documents, configuration parameters, machine profiles, user profiles, software components or similar, can be loaded into the control device.

Another advantageous embodiment enables wireless operation of the mobile control device, preferably using common and internationally acceptable radio standards.

Another embodiment enables the mobile control device to be operated on common and inexpensive networks.

Another advantageous embodiment enables the electronic components of the mobile control device to be supplied with power autonomously, at least temporarily. For example, the control device may be operated as a mobile control device wirelessly coupled for data transmission or, in the case of a hard-wired data coupling, it can be moved to another connection point without having to switch the control device off and back on again. However, only buffered and hence non-volatile memory modules or real-time clocks continue to be supplied when the control device is switched off or disconnected from the connection point.

Another advantageous embodiment has a safety switch element which is suitable, alone or in combination with other input elements, for safely initiating and preventing safety critical commands and procedures. The operating state is repeatedly detected by both processors or detection circuits and transmitted independently to the data transmission counter station. If a valid data telegram is not received at the data transmission counter station at regular intervals with the read state of the safety switch element, a non-authorizing operating state is automatically assumed, i.e. a production system or command switch is not operated or an emergency stop switch is operated. When the operating mode selection switch is transferred to a switched state within a safety system, an invalid operating mode is assumed and signaled.

An advantageous and particularly safe embodiment has at least one electrically operated multi-circuit safety switch element. Accordingly, at least two contacts are provided which signal the operating state independently of one another. The electrical circuit of the safety switch element is therefore also based on a single-fault safety design. A safety critical operating status is not detected unless it is signaled by all the contacts.

Another embodiment has safety switch elements which are standard in the field of industrial automation.

In the case of one advantageous embodiment, several safety switch elements are provided on the control device. These might be switch elements with different functions, such as stop switches and an ok key for example, or alternatively several safety switch elements which operate in the same manner, such as two ok keys assigned to different gripping areas of a mobile hand-held device which can be used alternatively or selectively depending on how it is being held.

In the case of another advantageous embodiment, the operating states of several safety switch elements which fulfill the same function, in particular several ok keys, are already correctly logically linked to one another inside the device and their operating state is individually encoded and transferred to the data telegrams. This means that depending on the model, mobile control devices may be of different designs with one or more ok keys without having to make allowance for this fact with respect to the data transmission counter station or in whatever data protocol is used. This linking is particularly practical if using the three-stage ok key which is now being commonly used with the operating statuses Not operated/ok/Emergency stop.

In a preferred embodiment, a data or signal connection between the first and second processor or detection circuit is provided, by means of which each of the two modules signals to the other the safety state internally detected by it, such as the detected operating state of a safety switch element for example, and the other compares this signaled state with the state it has detected. Only if the operating or safety state it has detected and the signaled one indicate an authorized state is this state encoded in the data telegram by the respective processor or detection circuit.

In an advantageous embodiment, several tags disposed within the detection range, in particular a log-on tag and simultaneously a key tag, are detected virtually simultaneously and without interference.

As a result of other embodiments, tags with several tag codes can be read. For example, different codes may be provided for each of the two processors separately in order to identify the data telegrams or other information may be provided in addition to the code, such as addresses for the connection set-up, position-related information, detailed user data or rights for example.

Another advantageous embodiment offers a technical guarantee that in the event of consecutive accesses to the reading unit and to the tag data by the first and second processor, this data does actually always originate from the tag and has not simply been retrieved from a temporary memory of the reading unit due to a defect or a fault.

Another advantageous embodiment technically ensures that when the control device is switched on, the requisite code for validly identifying the data telegrams can only be present in the control device if it was actually read from a corresponding tag by means of the reading unit and was not left in the memory from a previous assignment due to a software error, for example.

As a result of another advantageous embodiment, a more selective selection of a specific log-on tag or key tag is possible because a bearing is taken and the risk of mistakenly detecting other tags of the same type and in the vicinity is reduced.

Other advantageous embodiments use known, standard and reliable technical solutions for the reading unit.

Another advantageous embodiment provides a certain guarantee against a key tag bypassing or getting round the safety function because a key tag can be adhered or attached in some other way to the housing of the control device so that it can not be detached, which means that it can no longer be registered when the operator of the control device moves away or no other person can gain access to the functions of the control device. The critical minimum distance for valid detection is preferably set so that there must be at least a short clearance distance or air gap between the tag and the housing of the control device.

Another advantageous embodiment enables a more exact demarcation of the effective detection range of the reading unit than would be possible based on the detection sensitivity alone. In addition, the maximum detection distance for key tags and log-on tags is set differently even though they are based on the same technology.

Due to another embodiment, the two processors or detection circuits can be operated largely asynchronously and do not have to read the same data flow simultaneously when accessing the reading unit.

An advantageous and particularly safe embodiment ensures that a defect or fault caused by interference or switching or a software error does not occur in the two processors or detection circuits simultaneously and the principle of single-fault safety is preserved.

Another advantageous embodiment enables information to be output to the operator. In particular, output means with graphics capability permit a comprehensive display of machine and process data as well as advantageous control concepts such as menus and displayed operator control elements, in particular in conjunction with a touch-sensitive screen (touch screen).

As a result of another embodiment, finally, a mobile control device is proposed which is particularly suitable for positioning and set-up procedures, especially on machine tools and robots, and enables positioning procedures that are quick and precise at the same time.

Another objective is achieved by means of an electronically detectable tag according to another aspect of the invention. With respect to the assignment of the tag to a controllable technical system or to a specific operator, the essential aspect is the unequivocal code, which is a permanent unequivocal code. In technically identical embodiments, these tags can be used as portable key tags for assignment to an operator or as fixedly installed log-on tags for assignment to a controllable technical system, depending on the code. As a result, both types of tags can be detected with one and the same reading unit in the control device.

An embodiment ensures that the assigned permanent code is saved irrespective of whether a power supply is needed.

As a result of another advantageous embodiment, a tag is proposed which can be detected wirelessly and reliably by the reading unit.

Other embodiments incorporate suitable and standard technologies for the design of the electronically detectable tags. The advantage of this is that such tags can also be used in particular as key tags by other systems simultaneously, such as access control systems or for detecting working time.

Due to a specific embodiment, when the tag code in the control device is being detected by the two processors or detection circuits and optionally by the two processors or monitoring circuits in the data transmission counter station, it can be unequivocally established and guaranteed that the code being read is up to date and is not an old code read from a buffer memory due to a software error or a transmission error.

Another embodiment enables a data check to be run on a detected code for fault-free and complete detection. The likelihood of a code being detected incorrectly without it being known is therefore significantly reduced and if the check information is based on a particularly complex system, for example in the form of a CRC code, this can be practically ruled out.

Another advantageous embodiment of a key tag permits a convenient assignment to an operator which can not be lost.

Another advantageous embodiment enables the format of a key tag to be provided in the form of a standard identity card and also offers a means of providing visually detectable information about the owner of the key tag.

Another advantageous embodiment of a log-on tag enables a permanent, spatial assignment of the tag to a technical system, such as a machine tool, a robot, a crane or hoist or also to a construction vehicle or similar.

Another embodiment ensures that a log-on tag can not be removed, maliciously or for reasons of convenience, from its affixed position or from its intended position and moved to a position for logging on that is not acceptable for safety reasons or is even fixedly connected to a mobile control device.

As a result of another advantageous embodiment, the operator is provided with additional information about the assigned technical system even before the log-on tag is read, merely to inform him of the spatial assignment. Another possibility is to provide this information and the codes, which are otherwise electronically detected, in plain text so that if there is a technical defect preventing electronic detection, a data connection can nevertheless be established between the control device and the technical system once the codes have been manually input by the user.

Another advantageous embodiment obviates the need for special programming to personalize the log-on tags assigned to a safe data transmission counter station because the electronically detectable tag codes can be transmitted directly by cabling from the data transmission station into the log-on tag. This offers the possibility of further improving safety due to dynamic changes made to the security codes used.

Another objective is achieved by the features according to a further aspect of the invention, which result in a safe data transmission counter station.

The safe data transmission counter station according to this aspect of the invention constitutes the data communication partner with respect to a mobile control device in accordance with other aspects of the invention and together with the control device establishes an unequivocal point-to-point connection guaranteed to safety standards irrespective of the interconnected transmission media. Like the mobile control device, the data transmission counter station is also equipped with at least two processors or monitoring circuits which check data telegrams arriving via the data connection independently to ascertain their origin and ensure that they are free of errors, and evaluate messages embedded in them and feed corresponding signals or data into the safety loop of the technical system. This dual circuit system is again used to apply a safety concept based on single-fault safety. The essential fact is that security codes are available to these processors or monitoring circuits even before setting up a safe connection to a mobile control device, which are unequivocally assigned to tag codes of log-on tags, zone tags or key tags and by means of which the valid code of a data telegram can be unequivocally identified by an assigned tag code. In the simplest situation, the security code may correspond to the assigned tag code and a valid code can be verified by a simple comparison to ascertain whether they are identical. However, it would also be possible to use complex code mechanisms with mutually matched code pairs for encrypting and decrypting data telegrams.

Due to an advantageous embodiment, the security code may be held permanently in the data transmission counter station. In particular, a permissible security code may already be pre-set by the manufacturer and a non-variable pairing of log-on tags and data transmission stations may be set up by the manufacturer of these components.

Due to another advantageous embodiment, the data transmission station may also be used for the safely assigned reception of data telegrams, the messages of which not only relate to the safety switch elements or safety loop but also those which are defined for the actual controller of the technical system and have to be forwarded to the controller with or without encoding and checking.

Due to another embodiment, an unequivocal, permanent and safe data assignment is established between the data transmission counter station and the controller of the technical system. Messages transmitted from the mobile control device to the controller which have been safely assigned to the data transmission counter station beforehand are therefore also forwarded to the controller on a safely assigned basis.

Due to a structural embodiment, a safe data transmission counter station is proposed which can be directly combined with the controller of the technical system, thereby saving on space. This also makes it possible to opt for Integration in a controller concept of a modular design and in particular also enables retro-fitting of an existing controller. This is primarily of advantage for controllers used in plant systems.

Due to another structural embodiment, the data transmission counter station can be integrated in the controller in a compact and cost-saving arrangement. This is of particular advantage in the field of machine tools, robots, injection casting machines and such like where a greater number of identical and specially optimized controllers are used for what are essentially identical machines.

Another embodiment offers a compact structural unit comprising several components which are needed or offer practical advantages when it comes to implementing the invention, as a result of which installation work is reduced. A unit constructed in this manner is particularly suitable for subsequently replacing a previously existing connection point for hard-wired mobile control devices.

Due to other advantageous embodiments, standard interfaces are provided for establishing a compatible terminal link between the data transmission counter station and the safety loop of the technical system.

In a preferred embodiment, a data or signal connection is provided between the first and second processor or monitoring circuit, by means of which each of the two modules signals to the other one the safety state detected by it and the other one compares this signaled state with the state it has detected. Only if the signaled safety state and the one actually detected both identify a non-operated ok key or a non-operated stop switch is this state signaled by the respective processor or monitoring circuit to the safety loop as well.

An advantageous and particularly safe embodiment ensures that a defect or fault caused by interference or a switching or software error does not occur in the two processors or monitoring circuits simultaneously and that the principle of single-fault safety is maintained.

Another advantageous embodiment increases technical reliability and safety.

Another advantageous embodiment enables the wireless data connection of a mobile control device, thereby improving the flexibility and freedom of movement of the operator. Using radio standards that are known and standardized worldwide permits the use of inexpensive and reliable technology that is certified worldwide.

Another advantageous embodiment ensures that when the power supply is switched off or encounters a problem, the data transmission counter station does not initiate safety critical machine operations and these can not be carried out.

Another objective is achieved on the basis of a method according to a further aspect of the invention.

Due to the log-on procedure proposed by the invention, the command authority of an operator is unequivocally and safely assigned to a control device, at least with respect to issuing control commands. The operator receives in advance an electronically detectable key tag provided with an unequivocal user code identifying the user, which can be attached to the clothing or worn on the body or carried in a pocket for example. Other information may be encoded in addition to the user code, in particular user-related information. The user code is electronically detected by a reading unit provided in the control device and its authority to operate the control device and issue control commands is checked, and the available control commands are either released or locked accordingly. Once the operator has successfully logged onto the control device, the operator is registered as the active user and at least his user code is stored. Accordingly, a read user code can be compared with the registered user code at a later point in time and access or the control functions can be locked if no match is found with the detected user code. The detection range of the reading unit is preferably dimensioned so that a key tag carried by the operator is permissible and can be automatically detected when the operator of the control device moves close or picks up the portable mobile control device. This ensures that from the time the operator has successfully logged on and been assigned up to the point at which this assignment is terminated, exclusively this operator has access to the functions of the control device and any unauthorized or erroneous access is ruled out.

A preferred log-on procedure incorporates the safety concept based on single-fault safety due to the multi-circuit design of the processors or detection circuits so that an individual fault in one of the modules or circuits can not lead to a loss of safety function.

Another preferred embodiment of the method ensures that only authorized users can actively download an authorization signal to the safety loop and thus issue safety critical commands.

Due to another embodiment, the user code of the actively registered user is held in a memory so that it can be accessed and is therefore available for a comparison with a user code read later in order to continue verifying the identity of the operator.

Another preferred embodiment of the method ensures that a logged-on and registered operator remains logged on even if the control device is switched off or loses power. This ensures that once successfully logged on, no other person can gain access to the control device and in particular to a technical system with which a data connection has been established.

Another embodiment of the method ensures that only a single (or no) operator can be registered on or logged onto a control device at any one time.

As a result of another embodiment of the method, it is not necessary for the presence of the registered user to be verified by continuously reading and checking the user code once an operator has been registered. Instead, if a period, which is selected as being short for safety reasons, elapses during which no user activity is detected, it is concluded that the registered operator is absent and the relevant safety critical functions are locked. The functions are not released again until the registered user code has been read again.

In the case of another advantageous embodiment of the method, attempts are automatically made at regular intervals to detect the user code of the registered user again. If it is not possible for detection to proceed for a certain period, at least the safety critical control functions of the control device are locked and they are not released again until the user code of the registered users has been detected again.

Due to another embodiment of the log-on procedure, a more exact spatial demarcation of the effective detection range of the reading unit is obtained and a log-on is only possible in the immediate vicinity of the control device. This prevents any faulty or incorrect assignment of a person who coincidentally happens to be in the vicinity.

Another preferred embodiment of the method makes it impossible to deliberately bypass the technically operated safety mechanisms because a key tag is connected to the control device so that it can not be detached rather than being carried by the operator on his body or clothing.

As a result of another embodiment of the method, if a plurality of key tags are disposed within the detection range of the reading unit at the same time, only the one which is the closest to the control device will be read and accepted and is thus assigned the earliest to the actual operator. This reduces the risk of a person who happens to be coincidentally in the vicinity from being accidentally logged on. Furthermore, this obviates the need for the operator to make a manual selection from several simultaneously detected user identities.

As a result of another advantageous embodiment of the method, the user data, profiles and rights can be centrally managed. This being the case, rights can be granted to or withdrawn in a simple manner and without directly accessing the respective key tag of an operator, or individual key tags can be locked to prevent them from being used. By setting up user groups and rights groups, the various rights can be organized in a more transparent way. The key tags may be set up as static data and are provided with only one individual fixed, pre-set and non-changeable unequivocal code. Any change to the user data must then be made exclusively by means of the data stored on the server.

In the case of another advantageous embodiment of the method, other user-related information in addition to the user code is stored in the key tag and this is loaded directly into the control device. This being the case, all this information is immediately available in the control device and is so irrespective of the user profiles already available in the control device or regardless of whether a data connection to a server with user profiles exists.

As a result of another advantageous embodiment of the log-on procedure, additional safety against misuse of an identity of an operator is achieved. Accordingly, a key tag that has been picked up by mistake or due to confusion can not be used without validly entering the associated password.

Another embodiment of the log-on procedure enables different individual rights to be issued to several users.

Due to another advantageous embodiment, it is possible to obtain information about the currently registered operator at any time, which is of particular importance if the control device has been left without logging off correctly or is switched off.

As a result of another embodiment of the method, a log-on proceeds only on the basis of a conscious action on the part of the operator.

A preferred log-on procedure is provided for specific individual situations because it is quick and convenient as a result of the features defined in a further embodiment.

A log-on procedure extended by a practical alternative enables a simple and rapid log-on without a key tag or entering a password but whereby all the safety critical functions remain locked. This quick and anonymous log-on is primarily suitable for situations where only operating or diagnostic data of the controllable technical system has to be consulted but without influencing the system in any way which affects safety.

Another objective is solved by a method according to a further aspect of the invention. It offers a safe method of terminating the assignment of an operator to a control device. To ensure that a logged-on and actively registered operator can be sure that he can authorize exclusively safety critical control commands or corresponding machine operations, an existing log-on may also not be terminated again other than by this registered operator and must be so deliberately. The method proposed by the invention therefore ensures that when logging off or terminating the assignment, the identity of the operator is checked to ensure that it matches that of the registered operator.

The method according to another embodiment offers the possibility of enabling a specially authorized user or administrator to terminate an existing assignment even without the key tag of the registered operator. This is necessary if a key tag becomes unusable or defective during an existing log-on or an operator has forgotten to log off after completing his work and can no longer be reached in the meantime, which would mean that the control device or even the entire controllable technical system could be locked or blocked under certain circumstances.

An advantageous embodiment of the method ensures that a log-off can only take place by means of a conscious control action on the part of the registered operator.

Another objective is achieved by the log-on procedure according to a further aspect of the invention. In this instance, a security code encoded in a log-on tag is loaded into the mobile control device by means of a reading unit. The log-on tag is permanently assigned to the controllable technical system on a spatial basis and the security code is permanently registered as a permissible security code in the safe data transmission counter station, which is connected to the safety loop of the technical system. When the security code is read from the log-on tag into the mobile control device, an electronic check is run for evidence that the control device is or was disposed in the immediate vicinity of the log-on tag at the time of the log-on. If the read security code is then used to identify the data telegrams sent to the data transmission counter station, the log-on position can be unequivocally verified there. In the worst case scenario, any transmission errors of the interconnected data transmission means will then lead to nothing more than a failed log-on or data transmission but will not lead to a safety critical transmission to a wrong machine or plant under any circumstances. Due to the fact that the security code is detected independently on a multi-circuit basis by at least two processors or detection circuits, the safety concept based on single-fault safety is applied so that an individual defect in one of the circuits might lead to a loss of function but not a loss of safety function.

A preferred embodiment of the method ensures that the mobile control device is always assigned to only precisely one or no log-on point and hence to precisely one or no data transmission counter station.

As a result of another preferred embodiment, when a connection is being established between the mobile control device and the data transmission counter station, an unequivocal connection code is assigned to it and registered in both of the communication partners. This code is then used to identify and secure the communication. To this end, the data transmission counter station is configured so that only a single connection identification code can ever be registered. This enables a situation to be ruled out in which two mobile control devices are able to send data telegrams to the data transmission counter station at a specific point in time. This even enables two consecutive connections established by the same control device from the same log-on position to the same data transmission counter station to be unequivocally distinguished from one another.

Other embodiments of the method ensures that a new connection can not be established until an already existing connection has been terminated.

Due to another advantageous embodiment of the method, several permissible log-on tags can be assigned to a controllable technical system from different points which, although they all lead to the same data transmission counter station and to the same controller for establishing a connection, enable different control functions or output information to be optimized or restricted for the respective log-on position.

As a result of another embodiment of the method, information is obtained from the log-on tag about an operating range assigned to this log-on tag and is stored either in the mobile control device or the safe data transmission counter station for subsequent data security comparisons with information relating to position detected from zone tags which spatially delineate the permissible operating range.

As a result of a preferred embodiment of the method, the established connection is assigned not only device, address and position-related data but also user data. Accordingly, this user data can be used for additionally identifying and securing the ongoing communication and also to authorize specific functions at the controller for example.

Another embodiment of the method ensures that the user code assigned to a connection is also saved in the data transmission counter station even after a temporary failure of the power supply.

A particularly safe embodiment of the method ensures that only one or no operator is always registered in the data transmission counter station and that an existing registration can be terminated or changed by nobody other than the registered operator himself or by a specially authorized administrator. A registered operator can therefore always be certain that a connection established by him between a mobile control device and a data transmission counter station can not be terminated or changed without his knowledge.

Due to another embodiment of the method, different operators are assigned different rights or user profiles by the controller or the data transmission counter station.

Due to an advantageous embodiment of the method, the selection of operators with authorized access and the extent of their rights is not controlled solely by issuing key tags but can be fixed for every controllable technical system. Consequently, key tags and user codes which have become invalid or have been reported lost can be easily locked.

Due to a particularly advantageous embodiment of the method, the user administration can be handled centrally. As a result, the access rights of the users can be assigned rapidly and transparently on the basis of user groups and groups of rights. If changes have to be made, for example for employees who are new or have left, the relevant changes can be made quickly from one individual point.

Another advantageous embodiment of the method enables the behavior of the mobile control device and the controller to be flexibly adapted to the individual wishes and requirements of the respective operator. Due to the fact that the profile data is centrally stored, it is available to the operator from every mobile control device and controllable technical system connected to the server. It is of advantage if the profile data is organized separately so that the operator can generally assign it to a specific category of technical system or a specific type of control device or to individual technical systems and control devices.

Another advantageous embodiment of the method enables individual software components to be loaded regardless of the respective requirements of an operator or technical system. Specifically as a result, the software held in the control device can be kept more compact because it is not necessary to take account of every possible special requirement of a technical system beforehand. Another particular advantage is obtained in connection with software changes, which no longer have to be made in every individual control device but can be undertaken on a one-off basis from the technical system or even centrally from the server.

A particularly advantageous method is achieved on the basis of the features of another embodiment. In this instance, specific address, channel or assignment information is picked up from a log-on tag assigned to the technical system for establishing the connection to the data transmission counter station, also using several data transmission means if necessary.

As a result of another advantageous embodiment of the method, the operator is given information about the technical system and the data transmission counter station to which the connection was established. This enables any mistake made by the operator about the assignment to be dealt with in good time, reducing the risk of a dangerous situation occurring as a result of such a mistake. This is particularly important for controlling a newly created assignment or if work with a control device is interrupted for a longer period whilst an assignment continues to exist, for example during a lunch break.

Due to an advantageous and safe embodiment, an additional code may be used to identify and secure the data telegrams, by means of which a technically induced incorrect assignment or faulty transmission can be detected.

Another embodimen ensures that a previously created assignment continues to be saved even after a temporary loss of power.

Due to a preferred and safe embodiment, a condition is imposed whereby consecutively sent data telegrams are provided with information relating to time and this time-related information can be checked in the data transmission counter station. Consequently, old data telegrams which may contain messages relating to the operating states of a safety switch element that are no longer up to date and which have been retained or held in a buffer due to some technical fault or special conditions in the interconnected data transmission means for a longer period are detected and excluded from the ongoing processing.

Other embodiments of the method ensure that when the safe assignment of the mobile control device has been created, the fully automatic program-controlled operation of the controllable technical system is interrupted and the remaining machine operations will not take place until corresponding commands have been input from the control device. Typically, when a switch is made from automatic mode to a special operating mode, specific safety functions are also activated or deactivated, for example a force or speed of the drives is limited or safety switches by means of which the closed state of security doors is monitored during automatic mode are bridged.

Another objective is achieved on the basis of a further aspect of the invention. The result is a method of safely operating a connection established between a mobile control device and a safe data transmission counter station. Due to the method, technical faults or shortcomings in the interconnected data transmission means or individual technical faults in the control device or data transmission counter station will not lead to a loss of safety function. Data telegrams transmitted to the control device are identified with a previously read and registered security code, which means that the origin of the data telegrams can be reliably checked to ascertain the log-on position of the control device for the data transmission counter station. Similarly, every data telegram can be identified with an unequivocal connection code temporarily created for the duration of the connection. If the security code picked up from the log-on tag as the connection code is being registered during the course of the connection set-up is transmitted and checked as well, the connection code can subsequently be used to identify and check the data telegrams to an adequate degree.

A preferred embodiment of the method ensures that at least safety critical control actions are transmitted on a secure basis.

Another embodiment of the method improves safety against technically induced faults when detecting the switching state. This state is not encoded in the data telegrams by the respective processor or detection circuit unless both the operating statue actually detected and that signaled by the other processor identify that an ok key has been operated or a stop switch has not been operated.

Due to a particularly safe embodiment of the method, a continuous multi-circuit data transmission is proposed, thereby conforming to the concept of single-fault safety.

A preferred embodiment of the method improves safety with respect to technically induced faults when evaluating and feeding safety-relevant messages and signals into the safety loop of a technical system. This state is also not fed by the respective processor or detection circuit into the safety loop unless both the message content actually detected and that signaled by the other processor identify an operated ok key or a non-operated stop switch.

As a result of another preferred embodiment of the method, an additional check criterion is used, by means of which out of date data telegrams can be identified. Since the interconnected, non-safe data transmission means may also have buffer memories, a situation may arise due to technical faults or special operating conditions in which individual data telegrams do not arrive at the receiver until after a delay and signal an operated ok key or a non-operated stop switch, even though another operating state has been assumed in the meantime and is encoded in up to date data telegrams.

As a result of another embodiment of the method, an additional check criterion is also used, by means of which data telegrams that are no longer up to date can be identified to a certain extent. Consecutive numbering of the data telegrams results in an unequivocal chronological sequence so that the last validly evaluated message content can not be overwritten.

With a further embodiment of the method, another check criterion is used to secure the communication, by means of which an incorrect assignment caused as a result of an older connection to another mobile control device that has been terminated incorrectly, i.e. at the data transmission counter station only, can be prevented.

A preferred safe embodiment of the method ensures that when the data connection between the control device and data transmission counter station is interrupted causing a loss of control, the operator can immediately terminate all safety critical processes which might be running, irrespective of the cause, and the technical system is switched to a safe state.

An advantageous embodiment of the method ensures that when an operator has logged on or has been assigned a controllable technical system, a safe data transmission counter station and an assigned permissible operating range, only the safety critical control commands issued within this range are actually implemented.

Another objective is achieved according to a further aspect of the invention. This offers a log-off procedure to enable an existing point-to-point active connection for data transmission between a mobile control device proposed by the invention and a safe data transmission counter station proposed by the invention to be terminated correctly. To this end, the basic premise for correctly setting up another active connection later is established. Even if the connection is terminated incorrectly and incompletely in one of the two communication stations, no safety critical data telegrams identified by the connection identification code can be incorrectly generated or received and processed by the other respective station and another successful data transmission is not possible until a correct log-on procedure has been run.

An advantageous log-off procedure ensures that in order to establish an active connection for data transmission again, the security code needed for this purpose, having been checked, can be obtained exclusively by detecting a co-operating log-on tag again and the mobile control device must therefore be disposed within the detection range of this log-on tag.

As a result of an embodiment of the method, stored user information is also deleted from the memory in the data transmission counter station. This means that any other information used as check data for the connection is removed or becomes invalid so that other incorrectly received data telegrams from the preceding connection can no longer be identified and processed.

A preferred embodiment of the method ensures that the operating state of a safety switch element latched in the operating position, such as an emergency stop switch or a stop switch for the safety loop of the technical system, continues to remain unchanged even if the data connection is cut. This reliably prevents the technical system from being inadvertently started up again or the plant from unintentionally being shut down when the connection is cut.

Another preferred embodiment of the method ensures that no active ok signal can be fed into the safety loop by the data transmission counter station once the connection has been cut.

A preferred and safe embodiment of the method prevents any undesirable and inadvertent logging off.

As a result of another embodiment of the method, an inactive connection is automatically disconnected after an appropriate waiting time. Another command can not be transmitted until a new log-on procedure has been run.

A particularly advantageous and safe embodiment of the method ensures that a safe data assignment of a mobile control device can not be logged off or terminated and this assignment created except locally in the immediate vicinity of a co-operating log-on tag. This significantly reduces the risk of an unintentional or unconscious log-off and if the log-on tag is positioned accordingly, it is certain that although the operator is in observation range during log-off, he is no longer in the immediate risk area of the controllable technical system.

A safe embodiment of a method of switching on a mobile control device ensures that a data connection to a data transmission counter station for transmitting safety-relevant commands can be made exclusively locally from an assigned log-on tag and under no circumstances can it be made from any other point due to a software error.

An essential objective is achieved by a further aspect of the invention. Due to the safe and unequivocal assignment of the command authority of an operator to a mobile control device and the safe and unequivocal assignment of the mobile control device to the safety loop of a controllable technical system, the command authority of the operator is also safely and unequivocally assigned to the safety loop.

Another objective is achieved by a further aspect of the invention.

As a result of the features defined in a further embodiment, a method of recording safety-relevant log-on and log-off procedures as well as safety critical control procedures with exact user and time information is proposed. This provides an important starting point for investigating any accidents. Data is therefore also available for detecting a specific working time.

Figure 1:
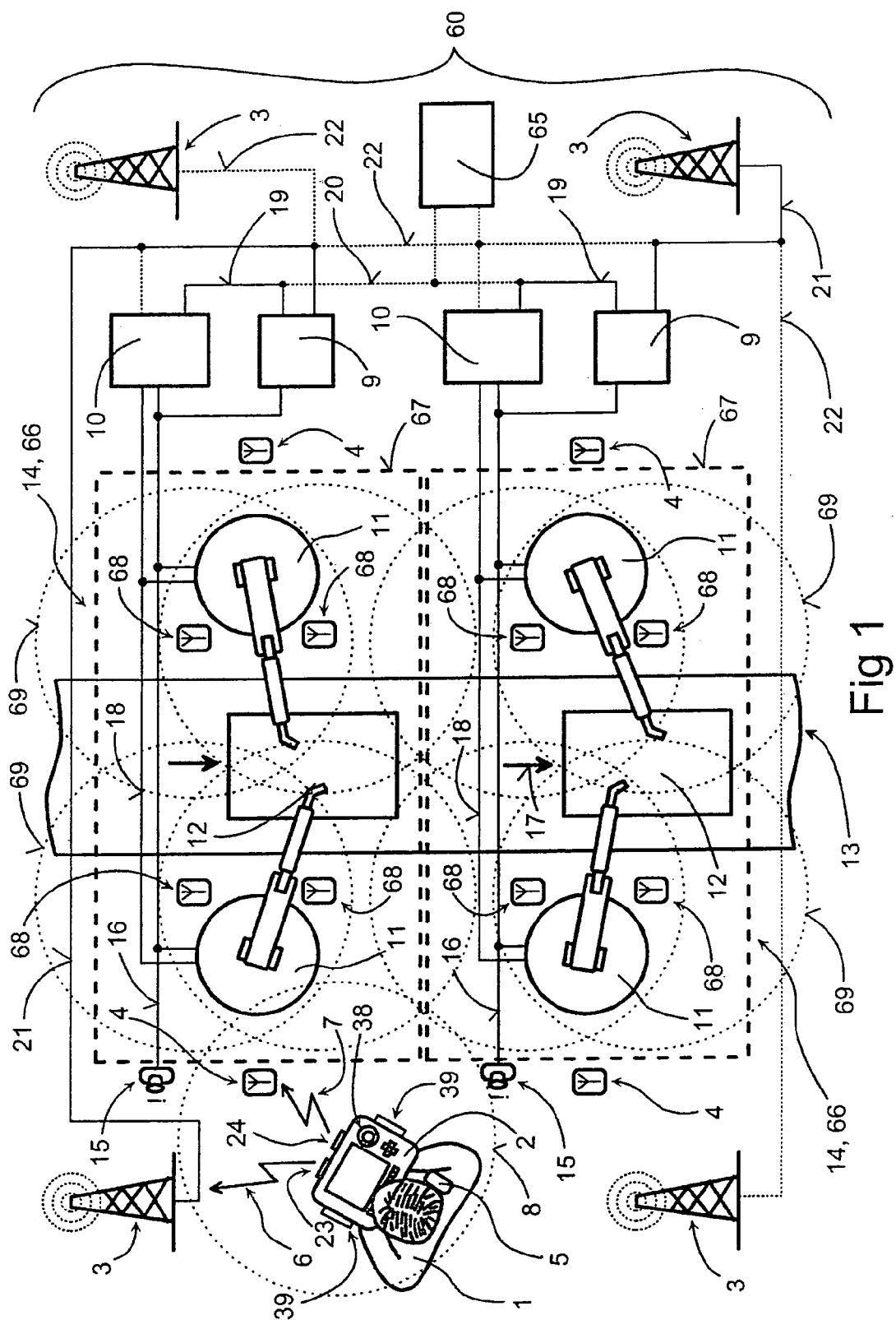
FIG. 1 is a detail of an industrial production system with several controllable technical systems representing one possible application of the methods and devices proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 provides an exemplary and schematic illustration of a detail on a simplified basis, showing an industrial system 60 for manufacturing or processing workpieces 12 by means of several co-operating manipulators 11 on an automated basis under the control of a program. The workpieces 12 are conveyed by a conveyor means 13 from one processing cell 66 into the next.

In the example illustrated, two of the respective manipulators 11 are controlled by a common controller 10 via co-operating control and sensor connections 18. Naturally, it would also be possible for each of the manipulators to be controlled by individual controllers as an alternative.

The two commonly controlled manipulators 11 are assigned to a common safety zone 14, which often spatially coincides with a processing cell 66 or processing station and is usually visibly cordoned off by appropriate protective fencing, protective doors, railings or cordons 67.

In terms of circuitry, a safety zone 14 is an area to which at least one or if necessary several, normally hard-wired safety switch elements in the form of an emergency stop switch 15 and appropriate signal transmission means are assigned for safety purposes, overall forming a safety loop 16. When one of the assigned safety switch elements 15 is triggered by a person, all the manipulators 11, machines and parts of the plant in the respective safety zone 14 are reliably and temporarily switched to a safe operating mode, in particular stopped. This enables existing risk situations which have been detected or are impending to be averted and undesired machine operations to be reliably prevented.

In large production plants 60, the controllers 10 of several processing cells 66 are normally connected to one another by means of a data network 20 to transmit data to one another and usually also to a central computer system or a server 65, for example for the purpose of detecting data centrally. Remote maintenance or remote diagnoses can also be undertaken by means of such a central computer system, as well as centrally organized software updates for the controllers 10, and optionally for the mobile control devices 2, and specific parameter sets and data sets can also be managed, in particular user, tool and machine profiles across the plant.

The production system illustrated also has a mobile control device 2 in the manner of a mobile hand-held device, by means of which an operator 1 can interchangeably take over the controllers of manipulators 11 and parts of the plant in the different processing cells 66. During this time, the parts of the plant in the respective processing cell do not operate in fully automatic mode and are secured by the closed cordon 67, and instead a secured special operating mode prevails in which the operator is also able to remain inside the cordon 67, for example to undertake exact programming and set-up work or for servicing purposes. In the secured special operating mode, safety critical machine operations are only possible whilst an ok key 39 on the hand-held device 2 is being actively operated by the operator 1. In addition, the hand-held device has a stop switch or emergency stop switch 38, which enables all the machine parts in the respective safety zone 14 to be temporarily switched into a safe state when operated.

For data transmission purposes, the mobile control device 2 is preferably wirelessly connected to a safe data transmission counter station 9 via an integrated radio interface 23, a radio data link 6 and a co-operating fixedly installed radio counter station 3 as well as via a hard-wired data cable 21. This being the case, a data transmission counter station 9 may either be assigned precisely a radio counter station 3 or it may even be structurally combined with it or, in order to provide a radio link to or coverage for outlying plants 60, it may have a plurality of radio counter stations 3 connected by means of data networks 22 and optionally several safe data transmission counter stations 9.

The safe data transmission counter station 9 is hard-wired into the safety loop 16 of the respective safety zone 14 or processing cell 66. It reliably forwards the operating and switch states of the safety switch elements 38, 39 of a mobile control device 2 connected for a data transmission at any one time to the safety loop 16.

In addition, it is preferable to provide a data connection 19 between the data transmission counter station 9 and the controller 10. General, non-specific safety critical commands or information can be transmitted from the mobile control device 2 via the data transmission counter station 9 to the controller by means of this data connection 19 and in some situations the same mechanisms which are used to secure the safety critical messages may also be used to secure the communication. The data transmission can naturally be sent in the reverse direction, or is bi-directional, from the controller 10 via the data transmission counter station 9 to the mobile control device 2, so that display, operating and diagnostic information in particular can be transmitted and output via co-operating output means of the mobile control device 2. The data connection 19 may be provided either in the form of an unequivocal point-to-point connection between precisely one data transmission counter station 9 and precisely one controller 10 or alternatively as a complete network 20 of several controllers 10, data transmission counter stations 9 and optionally a central server 65 connected to one another. In principle, however, the data connection 19 may be dispensed with altogether if the controllers 10 are connected directly to the network 22 and all non-safety critical information to and from the controller 10 is transmitted not via the data transmission counter stations 9 but instead from and to the mobile control device 2 directly via the radio counter stations 3.

One or more electronically detectable and coded log-on tags 4 are spatially assigned to the individual processing cells 66 in each case. The spatial assignment is set up in such a way that the operator is able to see immediately to which processing cell a specific log-on tag is assigned. For data transmission purposes, these log-on tags are each simultaneously assigned unequivocally to precisely one safe data transmission counter station 9 and hence unequivocally to precisely one safety zone 14 by means of unequivocal security codes which are permanently stored in both the log-on tags and the data transmission counter stations.

The operator 1 is in turn spatially assigned a key tag 5, likewise electronically detectable. The spatial assignment is organized in such a way that the key tag 5 is handed to the operator 1 and he carries it with him. The assignment for the purposes of data communication is set up on the basis of a user code of the key tag unequivocally identifying the person and optionally an assigned password.

In order to set a permissible operating range from which safety critical control commands can be issued and carried out, several zone tags 68 are disposed in this operating range. They have a specific detection distance 69 with respect to a reading device 24 integrated in the control device 2 within which a zone tag 68 can be safely detected by the reading unit 24 and the mobile control device 2. The zone tags 68 are disposed within the fixed operating range in such a way that the detection ranges of the zone tags partially overlap and at least one zone tag 68 can be safely detected by the mobile control device 2 at every point of the operating range.

As a special feature, the mobile control device incorporates the reading unit 24 which has only a short, locally limited detection range compared with the useful data connection 6. This reading unit 24 is suitable for detecting the log-on tags 4 and the key tags 5 and the zone tags 68 and the codes assigned to the respective tags.

Figure 2:
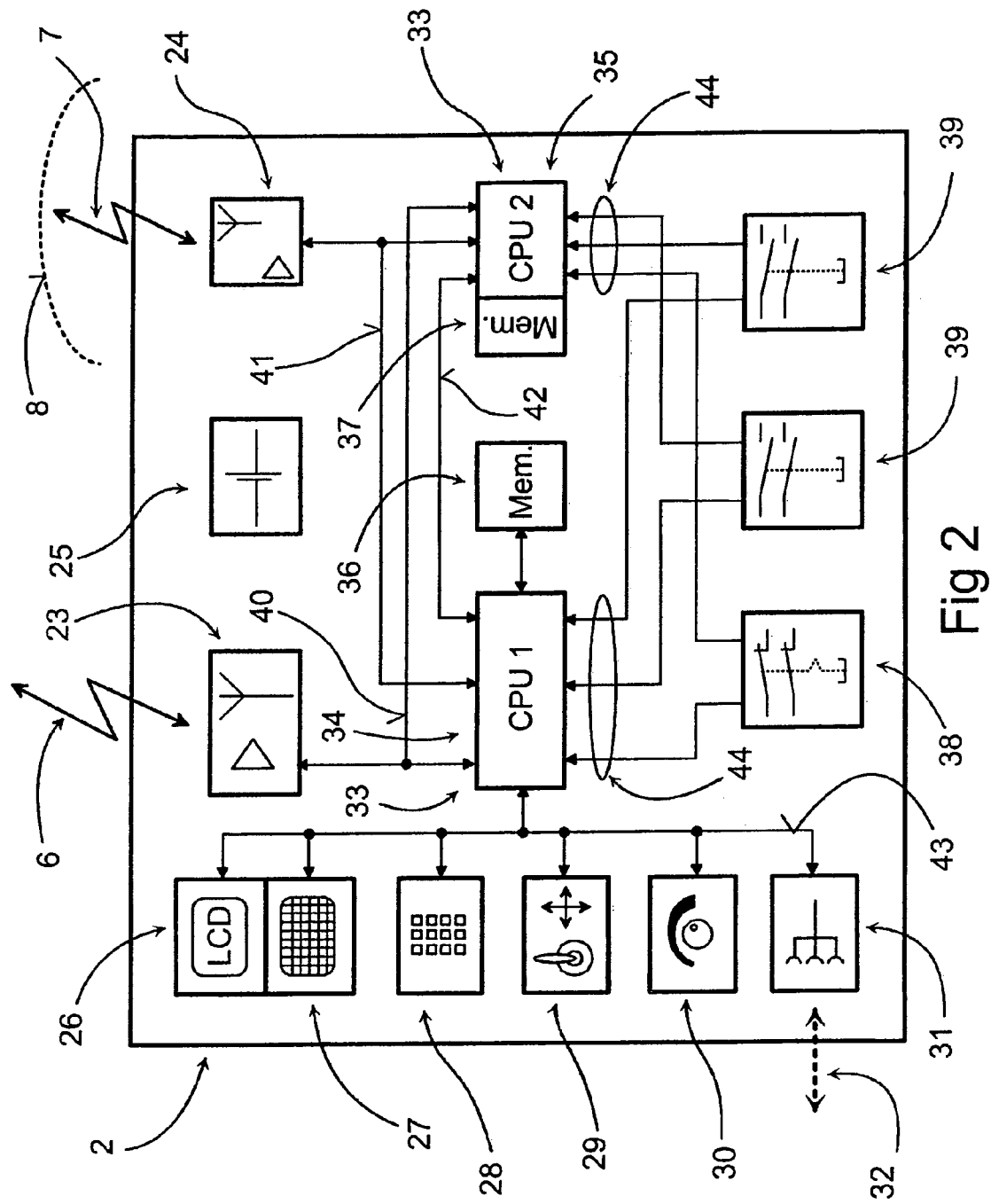
FIG. 2 is a schematic and exemplary illustration of the essential components of a safe mobile control device proposed by the invention.

FIG. 2 illustrates an'example of a mobile control device 2 proposed by the invention with its essential and typical functional components and data connections.

In order to temporarily establish an active connection 6 for data transmission with a controllable technical system, the control device 2 has an appropriate interface, in particular a radio interface 23 suitable for establishing a wireless data link. Naturally, it would also be possible and is common to provide an appropriate wired data connection as an alternative, for example via Ethernet.

In addition to the interface 23 for the actual useful data connection 6, a reading unit 24 with a locally limited detection range is provided for electronically detecting log-on tags 4, key tags 5 and zone tags 68. The reading unit 24 used together with the tags 4, 5 and 68 is preferably designed for contactless detection.

The mobile control device also has specially designed safety switch elements in the form of an emergency off or stop switch 38 with a mechanical lock in the operated position of a known type and optionally one or more ok keys 39. The ok keys 39 are constantly kept in the special operating mode of the controllable technical system by the operator 1 when running safety critical operations and these ok keys 39 are therefore preferably integrated in a gripping region of the mobile control device 2 and can be simultaneously operated by the hand used to hold the mobile control device 2. If several gripping regions are provided to enable the control device 2 to be held in different ways depending on the situation or as a means of providing ergonomic handling for both right-handed and left-handed persons, an ok key 39 is usually provided in each of these gripping regions. As indicated in the diagram, the safety switch elements 38, 39 are usually based on a two-circuit design and therefore have several simultaneously and independently triggered contacts.

The mobile control device 2 also has a first processor or detection circuit 33, which continuously and independently detects the operation or switching states of the safety switch elements 38, 39 via co-operating signal lines 44 and encodes them in corresponding data telegrams for transmission across the useful data connection 6.

Provided in parallel with this is a second processor or detection circuit 35, which, continuously, separately and independently of the first processor 34, detects the switch states of the safety switch elements 38, 39 via co-operating signal lines and encodes them in corresponding data telegrams for transmission across the useful data connection 6.

The two processors or detection circuits 33, 34 may also have access to the reading unit 24, likewise independently of one another, via a data cable 41 and detect a data flow generated by the reading unit 24 to which the two processors independently have access, although another alternative would naturally be to provide an additional second reading unit, in which case each of the two processors would access one of the reading units exclusively.

To enable specific security codes read from log-on tags 4 or read from key tag 5 by means of the reading unit 24 to be downloaded during the course of a log-on procedure proposed by the invention, the two processors or detection circuits 34, 35 are each assigned an independent memory 36 and 37.

The two processors 34 and 35 are preferably differently configured, belong to different processor families, and use different software and different technologies. This ensures that an individual fault caused by a hardware or software error or due to external interference does not affect both processors simultaneously and the two processors are not able to download faulty data telegrams simultaneously identifying a non-operated emergency off or stop switch or an operated ok key.

One of the processors or detection circuits 34 is usually of a relatively high-power design and in addition to detecting the operating states of the safety switch elements 38, 39 also takes charge of communication with other peripheral components of the mobile control device 2, for example a display 26 with graphic capability for displaying machine and process statuses, a touch-sensitive screen 27 structurally integrated with the display 26 for implementing flexible and comprehensive control concepts, a key pad 28 and different analog input means such as a joystick 29 or a hand wheel 30. An interface 31 may also be provided to permit the use of any extension modules. These might be interchangeable memory modules for example, in particular a compact flash memory, USB memory sticks or special interface modules in the form of Ethernet network cards. This high-power processor also takes charge of at least a major part of the communication across the useful data interface 23 to the controller of a controllable technical system connected for data transmission purposes or for displaying the corresponding data and statuses. Depending on the power bandwidth required, this first processor usually has a separately disposed, bigger memory 36.

The second processor or detection circuit 35 usually has a somewhat lower processing capacity and is preferably provided solely as an additional and independent detection facility and for encoding the operating states of the safety switch elements 38, 39. In many instances, it is sufficient to provide a simple micro-controller with a small working memory 37 already integrated in the micro-controller. Alternatively, the role of the second processor may be carried out by means of a programmable logic module.

As an alternative, it would naturally also be possible to opt for two independent, relatively basic processors or detection circuits which take charge of the safety-relevant functions exclusively, in which case the requisite capacity to compute more complex functions and provide the display is provided by another third processor.

A direct data or signal connection 42 is preferably also provided between the first and second processor or detection circuit. Via this connection, information can be exchanged between the processors 34 and 35, for example for a cross-comparison of the independently detected operating states of the safety switch elements, for setting up parameters or for running initialization procedures. Safety-related messages may also be transmitted across this data connection from one of the two processors to the other one, in which case these are identified by a security code and encapsulated by check data, and then either output directly via the interface 23 or are embedded in data telegrams created by this other processor and transmitted jointly.

Other standard components with higher requirements with regard to reliability used in process-based devices, e.g. watch-dog timers or similar, have long been known to the person skilled in the art and for the sake of clarity are not illustrated here.

Since the mobile control devices proposed by the invention are preferably provided in the form of mobile hand-held devices which are coupled wirelessly for data transmission purposes, an appropriate energy storage 25 is provided, in particular an electrochemical energy storage. This enables the components of the mobile control device to operate for at least periods independently of a hard-wired power supply, thereby ensuring that the operator has the best possible mobility. The connections to the power supply of the components are not illustrated in order to retain better clarity in FIG. 2 but the person skilled in the art is familiar with them in any case. The same also applies to components used to replace or regenerate the energy storage 25 or supply the stored energy accordingly.

Figure 3:
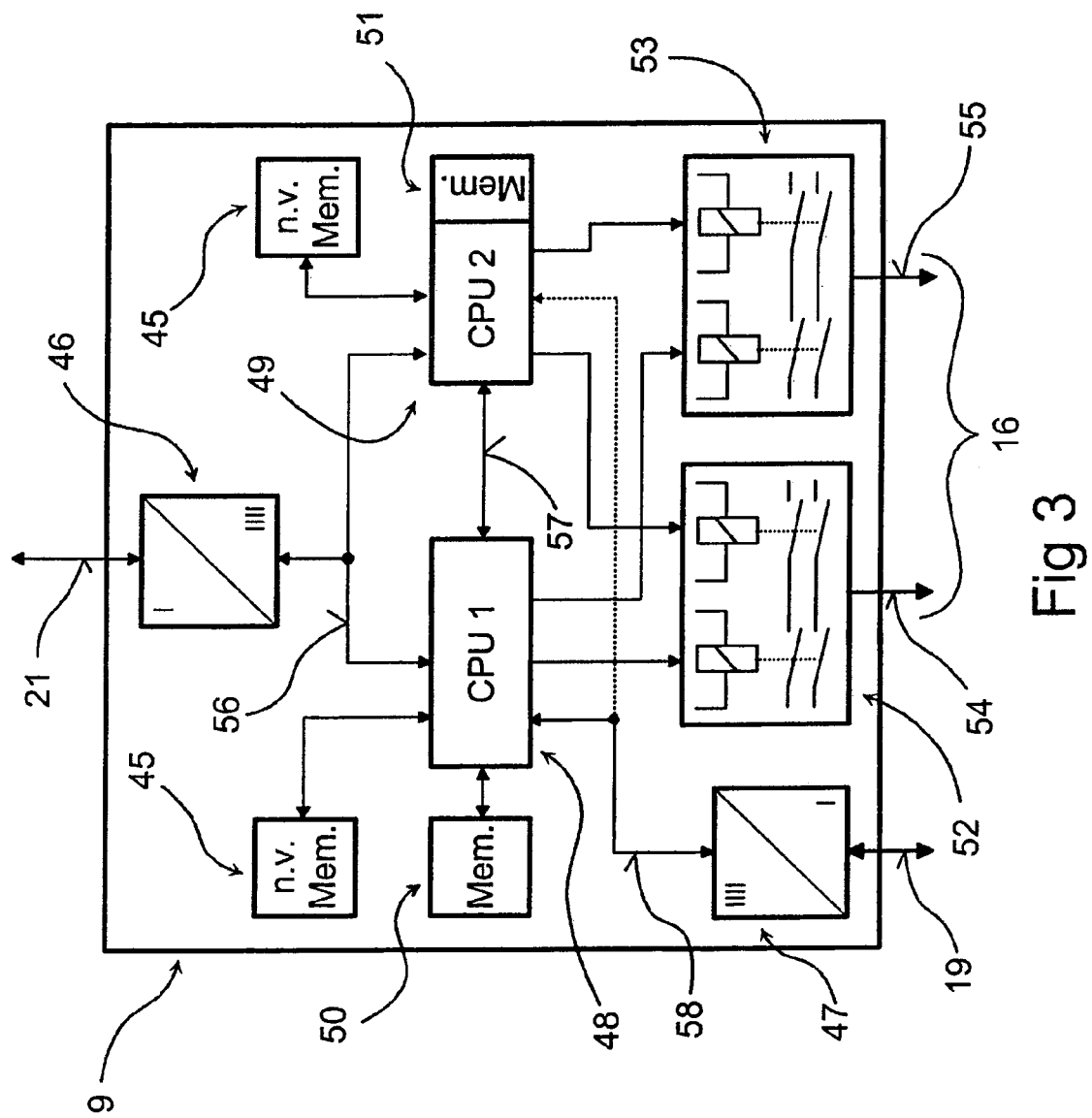
FIG. 3 is a schematic and exemplary illustration of the essential components of a safe data transmission counter station proposed by the invention.

FIG. 3 provides a schematic illustration of an example of a safe data transmission counter station 9 proposed by the invention with its essential and typical components.

The data transmission counter station 9 has an interface 46 for temporarily establishing a data connection 21 to a mobile control device for transmitting at least safety critical operating or signal states. Different data transmission means may be interconnected along this data connection 21, for example a transmitter and receiver unit for radio waves, network components or similar.

Two interfaces 52 and 53 are provided in the form of switch outputs for a hard-wired connection to integrate the data transmission counter station in the safety loop 16 of a controllable technical system to enable a signal transmission. The interface 52 is integrated in the emergency off safety loop 54 and the interface 53 is integrated in the ok-safety loop 55. As the symbols used for the interfaces indicate, these interfaces are preferably based on a two-circuit safety design, both outwards in the direction of safety loop 16 and inwards in the direction of the controller. Alternatively, instead of the symbolically indicated electromagnetic switch outputs, it would be possible to use electronic switch outputs of a similar design or, alternatively or in addition to the switch outputs 52 and 53, a specially designed data interface to the hard-wired data link on a special safety bus. The advantage of the electromechanical switch outputs illustrated, apart from a reliable galvanic separation, is that if the power supply fails at the data transmission counter station, the emergency off 54 and ok circuit 55 can be reliably opened and the controllable technical system can therefore be temporarily switched to a safe operating mode.

Just as the detection and encoding system of the operating states of the safety switch elements operate on a two-circuit basis in a mobile control device proposed by the invention due to a first and second processor or detection circuit, the electronic data evaluation in the data transmission counter station 9 is likewise based on a two-circuit design. This being the case, the safety critical signal states are received by at least a third and a fourth processor or monitoring circuit 48 and 49 depending on the data telegrams received independently across the interface 46 by two circuits, checked and fed into the safety loop.

The two processors 48 and 49 are each provided with a co-operating working memory 50 and 51. The two processors are also each provided with a non-volatile memory 45, in which at least one or more registered security codes and corresponding data relating to an existing active data connection and to a mobile control device and optionally a specific operator are stored so that they can not be lost due to a power failure. All of these memories may be provided as separate components or may be fixedly integrated in the respective processors.

A special data or signal connection 57 may also be provided between the two processors 48 and 49 for exchanging information. It may be used for running a continuous cross-comparison of the independently detected operating or signal states or the safety status detected internally in the modules, for example.

By means of the additional data interface 47, at least one of the two processors of the data transmission counter station may exchange data with the controller 10 which does not necessarily relate to safety critical control commands and display functions and which is not specially evaluated by the data transmission station or the contents processed but is merely forwarded between the mobile control device and controller. Accordingly, the safe point-to-point connection between the mobile control device 2 and data transmission counter station 9 may also be used for such data. The data connection 19 between the data transmission counter station 9 and controller 10 is preferably configured as an unequivocal point-to-point connection without any other subscribers, or the point-to-point assignment is secured on the basis of a fixed protocol. The fact that a control device is unequivocally and exclusively assigned to the data transmission counter station 9 simultaneously means that an unequivocal and exclusive assignment to the controller 10 is also guaranteed.

Other standard components such as a power pack and power terminal or perhaps a watchdog timer for the processors, for example, have been omitted from FIG. 3 with a view to retaining clarity but the person skilled in the art has long been familiar with their design, how they are connected and how they operate.

Figure 4C:
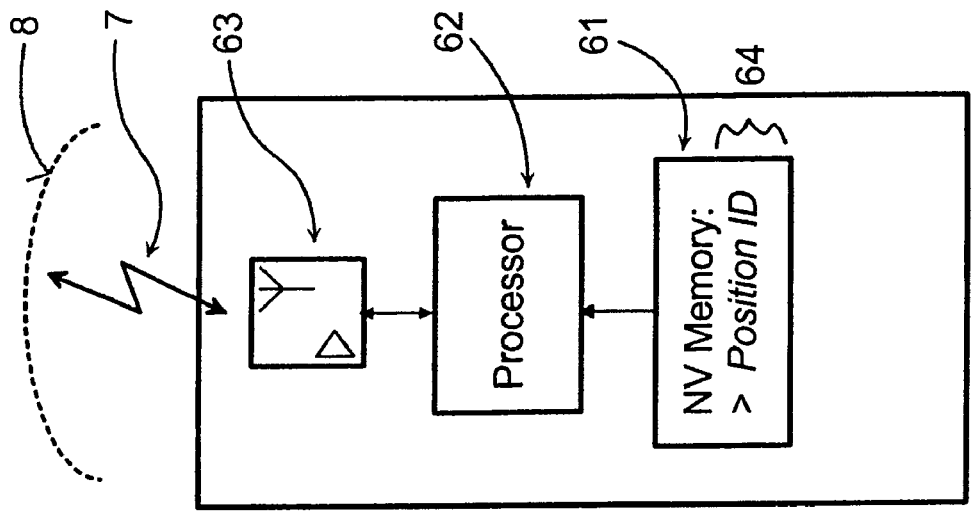
FIG. 4c is a simplified block diagram illustrating an example of a zone tag.
Figure 4B:
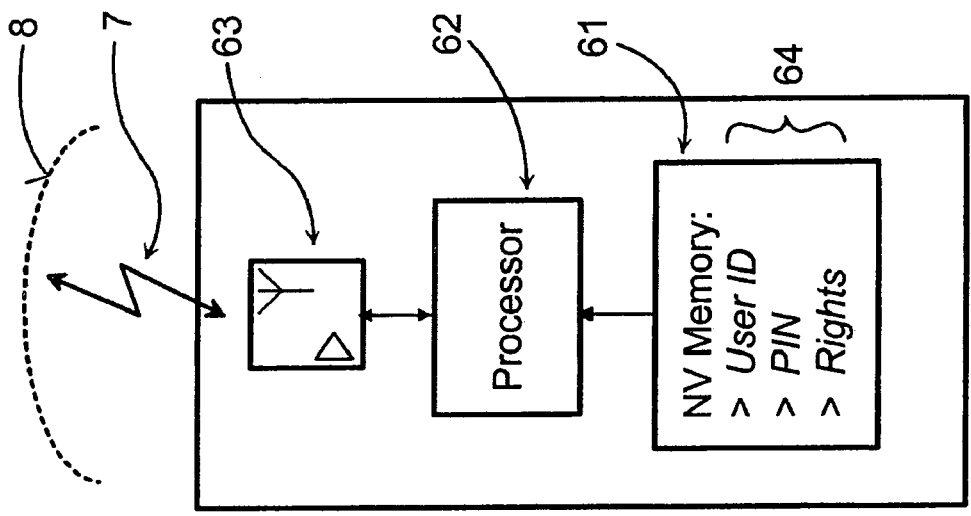
FIG. 4b is a simplified block diagram illustrating an example of a key tag.
Figure 4A:
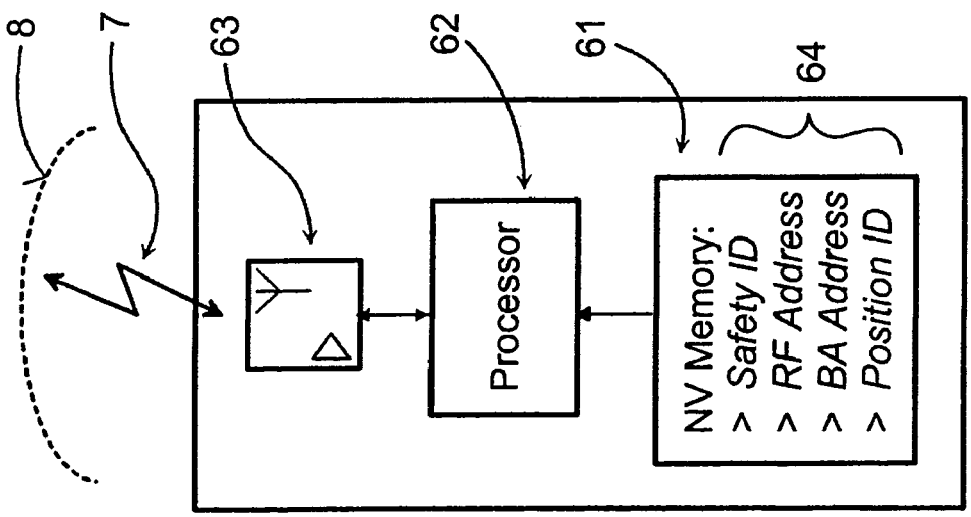
FIG. 4a is a simplified block diagram illustrating an example of a log-on tag.

FIGS. 4a, 4b and 4c are schematic illustrations showing an example of an electronically detectable log-on tag 4, an electronically detectable key tag 5 and a zone tag 68.

Both the log-on tag 4 and the key tag 5 as well as the zone tag 68 in this example are provided in the form of RF transponder tags (RFID), which can be electronically detected by an appropriately designed reading unit via an electromagnetic radio connection 7 with a locally limited range 8 respectively 69.

In terms of signal transmission, the log-on tag and the key tag and the zone tag are of identical designs and, in addition to the radio data interface 63, have a simple processor 62 and a non-volatile memory 64. The power supply for these components is not illustrated in the drawings but details can be obtained from the generally known prior art, for example provided in the form of so-called transponders by means of an electrochemical energy storages or as is the case with likewise known passive transponders, directly from external electromagnetic radio signals acting in the transmitter/receiver system.

The non-volatile memory 61 holds the specific codes 64 of the tag permanently.

In the case of the log-on tags 4, the non-volatile memory 61 is used to store at least one security code (security ID) and optionally address information (RF address, BA address) for setting up the data connection from a mobile control device to the log-on tag 4 assigned to the data transmission counter station or also information relating to the position or zone (position ID). This information relating to position might be information about the actual position of the log-on tag on the one hand or a code of an operating range assigned to the log-on tag on the other hand, which is fixed by co-operating zone tags and can be electronically detected. This establishes a reliable assignment between the log-on position and the permissible operating range.

In the case of key tags 5, at least a user code (USER ID) and optionally other information about the assigned user or for verifying PIN or password entries or also pertaining to individually assigned user rights (Rights) are stored in the non-volatile memory 61.

In the case of zone tags 68, the non-volatile memory 61 is used to store at least one position or zone code (position ID). This zone code may be identical for several adjacently disposed zone tags within a specific operating range or within a production cell and therefore identifies only one specific operating range as such or, alternatively, make it possible to obtain a more detailed bearing of the position within an operating range by issuing different, optionally additional, position-related information. If the zone code identifies only one specific operating range, it is also possible to define different and partially overlapping operating ranges by assigning several zone codes.

The non-volatile memories 61 may be of a design which can be programmed once only or which can be programmed several times or may already carry an unequivocal code which is fixed by the manufacturer and can not be changed.

For the sake of good order, finally, it should be pointed out that, in order to provide a clearer understanding of the structure of the devices, they and their constituent parts are illustrated to a certain extent out of scale and/or on an enlarged scale and/or on a reduced scale.

The devices described by way of example above are suitable for implementing the specified methods. The dependent claims should be read in conjunction with the introductory part of the description given above as well as the main parts of the description.

The objective underlying the independent inventive solutions may be found in the description.

Above all, the individual embodiments of the subject matter illustrated in FIGS. 1; 2; 3; 4a; 4b; 4c constitute independent solutions proposed by the invention in their own right. The objectives and associated solutions proposed by the invention may be found in the detailed descriptions of these drawings.

List of Reference Numbers

1 User, operator
2 Mobile control device
3 Radio counter station
4 Log-on tag
5 Key tag
6 Useful data radio connection
7 Log-on data radio connection, reading unit
8 Maximum log-on distance
9 Safe data transmission counter station
10 Controller, functional controller
11 Machine, robot, manipulator
12 Workpiece
13 Conveyor means
14 Safety zone
15 Hard-wired emergency off safety data network
16 Hard-wired safety loop
17 Workpiece conveyor device
18 Control and sensor signal
19 Controller data cable
20 Controller data network
21 Radio station data cable
22 Radio station data network
23 Useful data radio interface, radio station module
24 Log-on data, radio interface, reading unit, reading module
25 Voltage supply, accumulator
26 Output means, display
27 Input means, touch screen
28 Input means, keys, key pad, switch element
29 Input means, joystick
30 Input means, hand wheel, potentiometer
31 Interface for optional expansion modules or optional data interface
32 Optional data connection
33 Processor, CPU, detection circuit
34 First processor or detection circuit
35 Second processor or detection circuit
36 Working memory
37 On chip working memory
38 Emergency stop switch, multi-circuits safety switch element
39 Ok key, multi-circuits safety switch element
40 Data cable
41 Data cable
42 Data cable
43 Data cable, peripheral bus
44 Signal lines
45 Non-volatile memory
46 Data interface to the radio counter station
47 Data interface to the controller 48 Third processor or monitoring circuit
49 Fourth processor or monitoring circuit
50 Working memory
51 On chip working memory
52 Emergency off interface
53 Ok key safety loop
54 Emergency off safety loop
55 Ok key safety loop
56 Data connection
57 Data connection
58 Data connection
60 Industrial production system, controllable technical system, plant
61 Non-volatile memory
62 Processor
63 Transmitter/transceiver
64 Tag code
65 Server, computer system
66 Processing cell
67 Cordon
68 Zone tag
69 Detection distance of a zone tag

The invention claimed is:

1. Mobile control device, in particular a mobile hand-held device, for influencing at least a part of a controllable technical system,
  with at least one control element for issuing control commands by an operator,
    with at least one data interface for temporarily establishing an active data connection to a safe data transmission counter station assigned to the controllable technical system,
    with at least one standardized transmitter without any physically safe unequivocal point-to-point assignment to subscribers connected in between,
    with a first processor or detection circuit for encoding information, messages or signal states in a plurality of first data telegrams with a view to transmitting them across the active data connection to the safe data transmission counter station,
  wherein the mobile control device has a second processor or detection circuit and a reading unit,
  wherein the reading unit is suitable for reading, essentially simultaneously, several electronically readable tag codes when several log-in tags, zone tags or key tags are disposed within the detection range of the reading unit,
  wherein the second processor or detection circuit is configured to encode information, messages or signal states in the plurality of first data telegrams or in a plurality of second data telegrams, which first and optionally second data telegrams are intended for a transmission across the at least one data interface via the active connection to the safe data transmission counter station,
  wherein the first processor or detection circuit and the second processor or detection circuit are able to access the detected tag codes via the reading unit, and the first and/or optionally second data telegrams are generated, identified or sent under the influence of the detected tag codes,
  wherein at least one safety switch element which can be operated by the operator is provided for issuing safety critical control commands or authorizing or preventing potentially dangerous machine operations,
  wherein an operating state of the at least one safety switch element is repeatedly detected by the first processor or detection circuit and the second processor or detection circuit,
  wherein the detected operating state is encoded in the first and optionally second data telegrams,
  wherein the at least one safety switch element is of a multiple electric circuit design, in particular a two-circuit design,
  wherein several safety switch elements are provided, and wherein several, in particular two, safety switch elements each with identical functions are provided, the operating states of each of which are detected by the first processor or detection circuit and the second processor or detection circuit,
  wherein the detected operating states are logically linked by the first processor or detection circuit and the second processor or detection circuit to form an overall operating state depending on the function of the safety switch elements, and
  wherein the overall operating state is encoded in the first and optionally second data telegrams.

2. Mobile control device according to claim 1, wherein the at least one data interface is configured for bi-directional data transmission.

3. Mobile control device according to claim 1, wherein the at least one data interface is configured for establishing a radio data link, in particular based on the Wireless LAN (WLAN), Bluetooth or ZigBee Standard.

4. Mobile control device according to claim 1, wherein the at least one data interface is configured for establishing a connection to a cabled network or to a bus system with several subscribers, in particular to an Ethernet network.

5. Mobile control device according to claim 1, wherein the control device has an electrochemical or electrostatic energy storage, in particular an accumulator, a battery, a fuel cell or a capacitor, for at least temporarily supplying power to at least some electronic components.

6. Mobile control device according to claim 1, wherein the at least one safety switch element is provided in the form of an emergency stop switch certified to a standard, alternatively as a certified machine-stop switch, an ok key or a safe operating mode selection switch.

7. Mobile control device according to claim 1, wherein the reading unit has a directional detection characteristic.

8. Mobile control device according to claim 1, wherein the reading unit is provided in the form of a transponder-receiver system.

9. Mobile control device according to claim 1, wherein the reading unit is provided in the form of a barcode reader.

10. Mobile control device according to claim 1, wherein the reading unit is provided in the form of a receiver for pulsed or modulated light, in particular infrared light.

11. Mobile control device according to claim 1, wherein the reading unit signals if there is a drop below a minimum distance to a key tag, log-on tag or zone tag in the detection range or provides appropriate information about distance.

12. Mobile control device according to claim 1, wherein the reading unit signals if a maximum distance from a key tag, log-on tag or zone tag in the detection range is exceeded or provides appropriate information about the distance.

13. Mobile control device according to claim 1, wherein the first processor or detection circuit and the second processor or detection circuit are able to access the reading unit independently of one another.

14. Mobile control device according to claim 1, wherein at least one output device is provided, in particular in the form of a display with graphics capability.

15. Mobile control device according to claim 1, wherein at least one analog inputting device or at least one input device operating in an analog manner is provided, in particular in the form of a touch screen, joystick, hand wheel or potentiometer.

16. Key tag for use in combination with a mobile control device according to claim 1, wherein the key tag contains at least one permanently assigned tag code which can be electronically detected by the reading unit disposed in the control device, and
    wherein a fixing ring or a fixing clip is provided, which can be used to prevent detachment.

17. Key tag according to claim 16, wherein a non-volatile memory is provided, in which the at least one permanently assigned tag code is stored so that the at least one permanently assigned tag code can be accessed.

18. Key tag according to claim 16, wherein a transmitter device is provided for wirelessly transmitting short data sequences across short transmission distances to a reading unit disposed in the immediate vicinity.

19. Key tag according to claim 16, wherein the log-on tag, zone tag or key tag is provided in the form of a passive RF transponder or a SAW transponder.

20. Key tag according to claim 16, wherein the key tag is provided in the form of an active RF transponder.

21. Key tag according to claim 16, wherein the key tag is provided in the form of an active infrared transmitter tag.

22. Key tag according to claim 20, wherein in addition to the permanently assigned tag code, information relating to time or sequence information is transmitted.

23. Key tag according to claim 16, wherein the at least one permanently assigned tag code is applied so that the at least one permanently assigned tag can be optically scanned.

24. Key tag according to claim 23, wherein the at least one tag code is a bar code.

25. Key tag according to claim 16, wherein the tag code contains additional check information via which correct and complete detection of the tag code can be checked in readiness for transmitting data.

26. Mobile control device, in particular a mobile hand-held device, for influencing at least a part of a controllable technical system,
    with at least one control element for issuing control commands by an operator,
    with at least one data interface for temporarily establishing an active data connection to a safe data transmission counter station assigned to the controllable technical system,
    with at least one standardized data transmitter without any physically safe unequivocal point-to-point assignment to subscribers connected in between,
    with a first processor or detection circuit for encoding information, messages or signal states in a plurality of first data telegrams with a view to transmitting them across the active data connection to the safe data transmission counter station,
    wherein the mobile control device has a second processor or detection circuit and a reading unit,
    wherein the reading unit is suitable for reading, essentially simultaneously, several electronically readable tag codes when several log-in tags, zone tags or key tags are disposed within the detection range of the reading unit,
    wherein the second processor or detection circuit is configured to encode information, messages or signal states in the plurality of first data telegrams or in a plurality of second data telegrams, which first and optionally second data telegrams are intended for a transmission across the at least one data interface via the active connection to the safe data transmission counter station,
    wherein the first processor or detection circuit and the second processor or detection circuit are able to access the detected tag codes via the reading unit, and the first and/or optionally second data telegrams are generated, identified or sent under the influence of the detected tag codes,
    wherein at least one safety switch element which can be operated by the operator is provided for issuing safety critical control commands or authorizing or preventing potentially dangerous machine operations,
    wherein the operating state of the at least one safety switch element is repeatedly detected by the first processor or detection circuit and the second processor or detection circuit,
    wherein the detected operating state is encoded in the first and optionally second data telegrams, and
    wherein a signal connection or a data connection is provided between the first processor or detection circuit and the second processor or detection circuit, via which information is transmitted for a cross-comparison of the respective detected operating state of the at least one safety switch element.

27. Mobile control device, in particular a mobile hand-held device, for influencing at least a part of a controllable technical system,
    with at least one control element for issuing control commands by an operator,
    with at least one data interface for temporarily establishing an active data connection to a safe data transmission counter station assigned to the controllable technical system,
    with at least one standardized data transmitter without any physically safe unequivocal point-to-point assignment to subscribers connected in between,
    with a first processor or detection circuit for encoding information, messages or signal states in a plurality of first data telegrams with a view to transmitting them across the active data connection to the safe data transmission counter station,
    wherein the mobile control device has a second processor or detection circuit and a reading unit,
    wherein the reading unit is suitable for reading, essentially simultaneously, several electronically readable tag codes when several log-in tags, zone tags or key tags are disposed within the detection range of the reading unit,
    wherein the second processor or detection circuit is configured to encode information, messages or signal states in the plurality of first data telegrams or in a plurality of second data telegrams, which first and optionally second data telegrams are intended for a transmission across the at least one data interface via the active connection to the safe data transmission counter station,
    wherein the first processor or detection circuit and the second processor or detection circuit are able to access the detected tag codes via the reading unit, and the first and/or optionally second data telegrams are generated, identified or sent under the influence of the detected tag codes,
    wherein the reading unit is suitable for detecting several different tag codes, essentially simultaneously, from an individual log-on tag, zone tag or key tag, wherein the reading unit is configured for detecting several security codes, in particular a first security code and a second security code different from the first security code, and wherein the first processor or detection circuit and the second processor or detection circuit each use different security codes for encoding the data telegrams.

28. Mobile control device, in particular a mobile hand-held device, for influencing at least a part of a controllable technical system, with at least one control element for issuing control commands by an operator, with at least one data interface for temporarily establishing an active data connection to a safe data transmission counter station assigned to the controllable technical system, with at least one standardized data transmitter without any physically safe unequivocal point-to-point assignment to subscribers connected in between, with a first processor or detection circuit for encoding information, messages or signal states in a plurality of first data telegrams with a view to transmitting them across the active data connection to the safe data transmission counter station, wherein the mobile control device has a second processor or detection circuit and a reading unit, wherein the reading unit is suitable for reading, essentially simultaneously, several electronically readable tag codes when several log-in tags, zone tags or key tags are disposed within the detection range of the reading unit, wherein the second processor or detection circuit is configured to encode information, messages or signal states in the plurality of first data telegrams or in a plurality of second data telegrams, which first and optionally second data telegrams are intended for a transmission across the at least one data interface via the active connection to the safe data transmission counter station, wherein the first processor or detection circuit and the second processor or detection circuit are able to access the detected tag codes via the reading unit, and the first and/or optionally second data telegrams are generated, identified or sent under the influence of the detected tag codes, and wherein the reading unit has no or only a restricted buffer for buffering read data, which under no circumstances enables full storage of the complete data set provided with check data contained in a tag code.

29. Mobile control device, in particular a mobile hand-held device, for influencing at least a part of a controllable technical system, with at least one control element for issuing control commands by an operator, with at least one data interface for temporarily establishing an active data connection to a safe data transmission counter station assigned to the controllable technical system, with at least one standardized data transmitter without any physically safe unequivocal point-to-point assignment to subscribers connected in between, with a first processor or detection circuit for encoding information, messages or signal states in a plurality of first data telegrams with a view to transmitting them across the active data connection to the safe data transmission counter station, wherein the mobile control device has a second processor or detection circuit and a reading unit, wherein the reading unit is suitable for reading, essentially simultaneously, several electronically readable tag codes when several log-in tags, zone tags or key tags are disposed within the detection range of the reading unit, wherein the second processor or detection circuit is configured to encode information, messages or signal states in the plurality of first data telegrams or in a plurality of second data telegrams, which first and optionally second data telegrams are intended for a transmission across the at least one data interface via the active connection to the safe data transmission counter station, wherein the first processor or detection circuit and the second processor or detection circuit are able to access the detected tag codes via the reading unit, and the first and/or optionally second data telegrams are generated, identified or sent under the influence of the detected tag codes, and wherein a memory in which a read security code can be stored for access is provided in the form of a volatile memory and when the control device is switched off, any security codes stored are deleted to be unrecoverable.

30. Mobile control device, in particular a mobile hand-held device, for influencing at least a part of a controllable technical system, with at least one control element for issuing control commands by an operator, with at least one data interface for temporarily establishing an active data connection to a safe data transmission counter station assigned to the controllable technical system, with at least one standardized data transmitter without any physically safe unequivocal point-to-point assignment to subscribers connected in between, with a first processor or detection circuit for encoding information, messages or signal states in a plurality of first data telegrams with a view to transmitting them across the active data connection to the safe data transmission counter station, wherein the mobile control device has a second processor or detection circuit and a reading unit, wherein the reading unit is suitable for reading, essentially simultaneously, several electronically readable tag codes when several log-in tags, zone tags or key tags are disposed within the detection range of the reading unit, wherein the second processor or detection circuit is configured to encode information, messages or signal states in the plurality of first data telegrams or in a plurality of second data telegrams, which first and optionally second data telegrams are intended for a transmission across the at least one data interface via the active connection to the safe data transmission counter station, wherein the first processor or detection circuit and the second processor or detection circuit are able to access the detected tag codes via the reading unit, wherein the first and/or optionally second data telegrams are generated, identified or sent under the influence of the detected tag codes, and wherein the first processor or detection circuit and the second processor or detection circuit are differently configured and are optionally configured to operate different assigned software or programmed logic links.

31. Key tag for use in combination with a mobile control device according to claim 1, wherein the key tag contains at least one permanently assigned tag code which can be electronically detected by the reading unit disposed in the control device, and wherein print or text or a visually perceptible mark, in particular a signature or a photographic image, is applied which enables conclusions to be drawn about a person to whom the key tag has been assigned.

32. Log-on tag or zone tag for use in combination with a mobile control device according to claim 1, wherein the log-on tag or zone tag contains at least one permanently assigned tag code which can be electronically detected by the reading unit disposed in the control device, and wherein a hard-wired data or signal connection between the log-on tag or zone tag and a safe data transmission counter station assigned to the log-on tag or zone tag is provided, via which at least one electronically detectable tag code can be transmitted from the data transmission counter station to the log-on tag or zone tag.

33. Log-on tag or zone tag according to claim 32, wherein a fixing device is provided, which permits a permanent spatial assignment to a controllable technical system or a specific part of this system.

34. Log-on tag or zone tag according to claim 32, wherein if the fixing device is released, destruction of or a modification to the log-on tag or zone tag causes further electronic detection of a stored security and/or zone code to be prevented.

35. Log-on tag or zone tag according to claim 32, wherein print, text or a visually perceptible code is applied, which enables conclusions to be drawn about the controllable technical system or the part of the controllable technical system assigned to the log-on tag or zone tag, in particular an assigned security cell of the controllable technical system.

* * * * *